(12) United States Patent
Odry et al.

(10) Patent No.: US 11,049,243 B2
(45) Date of Patent: Jun. 29, 2021

(54) TARGET DETECTION IN LATENT SPACE

(71) Applicant: Siemens Healthcare GmbH, Erlangen (DE)

(72) Inventors: Benjamin L. Odry, West New York, NJ (US); Dorin Comaniciu, Princeton Junction, NJ (US); Bogdan Georgescu, Plainsboro, NJ (US); Mariappan S. Nadar, Plainsboro, NJ (US)

(73) Assignee: Siemens Healthcare GmbH, Erlangen (DE)

( * ) Notice: Subject to any disclaimer, the term of this patent is extended or adjusted under 35 U.S.C. 154(b) by 55 days.

(21) Appl. No.: 16/483,887

(22) PCT Filed: Nov. 3, 2017

(86) PCT No.: PCT/EP2017/078163
§ 371 (c)(1),
(2) Date: Aug. 6, 2019

(87) PCT Pub. No.: WO2018/192672
PCT Pub. Date: Oct. 25, 2018

(65) Prior Publication Data
US 2020/0020098 A1 Jan. 16, 2020

Related U.S. Application Data

(60) Provisional application No. 62/487,000, filed on Apr. 19, 2017.

(51) Int. Cl.
*G06T 7/00* (2017.01)
*G06K 9/62* (2006.01)

(52) U.S. Cl.
CPC .......... *G06T 7/0012* (2013.01); *G06K 9/6245* (2013.01); *G06K 9/6284* (2013.01); *G06K 9/6296* (2013.01); *G06K 2209/053* (2013.01)

(58) Field of Classification Search
CPC .. G06T 7/0012; G06K 9/6245; G06K 9/6284; G06K 9/6296; G06K 2209/053
See application file for complete search history.

(56) References Cited

U.S. PATENT DOCUMENTS

2016/0239969 A1 8/2016 Davatzikos et al.
2017/0007148 A1* 1/2017 Kaditz et al. .......... A61B 5/055
(Continued)

OTHER PUBLICATIONS

Jinwon An and Sungzoon Cho, Variational Autoencoder based Anomaly Detection using Reconstruction Probability, 2015, SNU Data Mining Center, Feb. 2015 Special Lecture on IE, http://dm.snu.ac.kr/static/docs/TR/SNUDM-TR-2015-03.pdf (this is also an IDS reference) (Year: 2015).*

(Continued)

*Primary Examiner* — Ping Y Hsieh
*Assistant Examiner* — Xiao Liu

(57) ABSTRACT

A method for processing medical image data comprises: inputting medical image data to a variational autoencoder configured to reduce a dimensionality of the medical image data to a latent space having one or more latent variables with latent variable values, such that the latent variable values corresponding to an image with no tissue of a target tissue type fit within one or more clusters; determining a probability that the latent variable values corresponding to the medical image data fit within the one or more clusters based on the latent variable values; and determining that a tissue of the target tissue type is present in response to a determination that the medical image data have less than a threshold probability of fitting within any of the one or more clusters based on the latent variable values.

16 Claims, 19 Drawing Sheets

(56) References Cited

U.S. PATENT DOCUMENTS

2017/0076224 A1    3/2017   Munawar
2017/0161635 A1*   6/2017   Oono ................. G06N 3/082

OTHER PUBLICATIONS

Eunbyung Park, Manifold Learning with Variational Auto-encoder for Medical Image Analysis, 2015, https://www.semanticscholar.org/paper/Manifold-Learning-with-Variational-Auto-encoder-for-Park/b7bbcd02597d797d359dc78b16fd154659bc1f6b (Year: 2015).*

Ruzgine et al, Ransac for Outlier Detection, 2005, Geodesy and Cartography, vol. XXXI, No. 3, pp. 83-87, https://www.tandfonline.com/doi/pdf/10.1080/13921541.2005.9636670 (Year: 2005).*

Bhuyan et al, Network Anomaly Detection: Methods, Systems and Tools, 2014, IEEE Communications Surveys & Tutorials, vol. 16. 1, First Quarter 2014 pp. 303-336 (Year: 2014).*

Kriegel et al, Outllier Detection Techniques, 2010, The 2010 SIAM International Conference on Data Mining, https://www.dbs.ifi.lmu.de/~zimek/publications/KDD2010/kdd10-outlier-tutorial.pdf (Year: 2010).*

Anonymous: "Medical Imaging: Concepts, Methodologies, Tools, and Applications"; In: "Medical Imaging: Concepts, Methodologies, Tools, and Applications"; Jul. 18, 2016 (Jul. 18, 2016), IGI Global, XP055449000, ISBN: 978-1-5225-0572-3, pp. 575-578.

Kingma, Diederik P. et al.: "Auto-encoding variational bayes"; in: arXiv: 1312.6114v10; pp. 1-14; 2014.

Simonyan, Karen et al. "Deep Inside Convolutional Networks: Visualising Image Classification Models and Saliency Maps" arXiv:1312.6034v2 (Dec. 20, 2013).

An, Jinwon, and Sungzoon Cho. "Variational autoencoder based anomaly detection using reconstruction probability." Special Lecture on IE 2.1 (2015).

Prastawa M. et al: "A brain tumor segmentation framework based on outlier detection"; Medical Image Anal, Oxford University Press, Oxford, GB, vol. 8, No. 3, pp. 275-283, XP004533586, ISSN: 1361-8415, DOI:10.1016/J.MEDIA.2004.06.007.

Ganin, Yaroslav, et al. "Domain-adversarial training of neural networks" The Journal of Machine Learning Research 17.1 (2016): 2096-2030.

Huang, Gao, et al. "Densely connected convolutional networks." Proceedings of the IEEE conference on computer vision and pattern recognition, pp. 4700-4708, 2017.

He, Kaiming, et al. "Deep residual learning for image recognition." Proceedings of the IEEE conference on computer vision and pattern recognition, pp. 770-778, 2016.

Ioffe, Sergey, and Christian Szegedy. "Batch normalization: Accelerating deep network training by reducing internal covariate shift." arXiv preprint arXiv:1502.03167 (2015).

Wu, Yifan, Tianshu Ren, and Lidan Mu. "Importance reweighting using adversarial-collaborative training." NIPS 2016 Workshop, 6 pages, 2016.

* cited by examiner

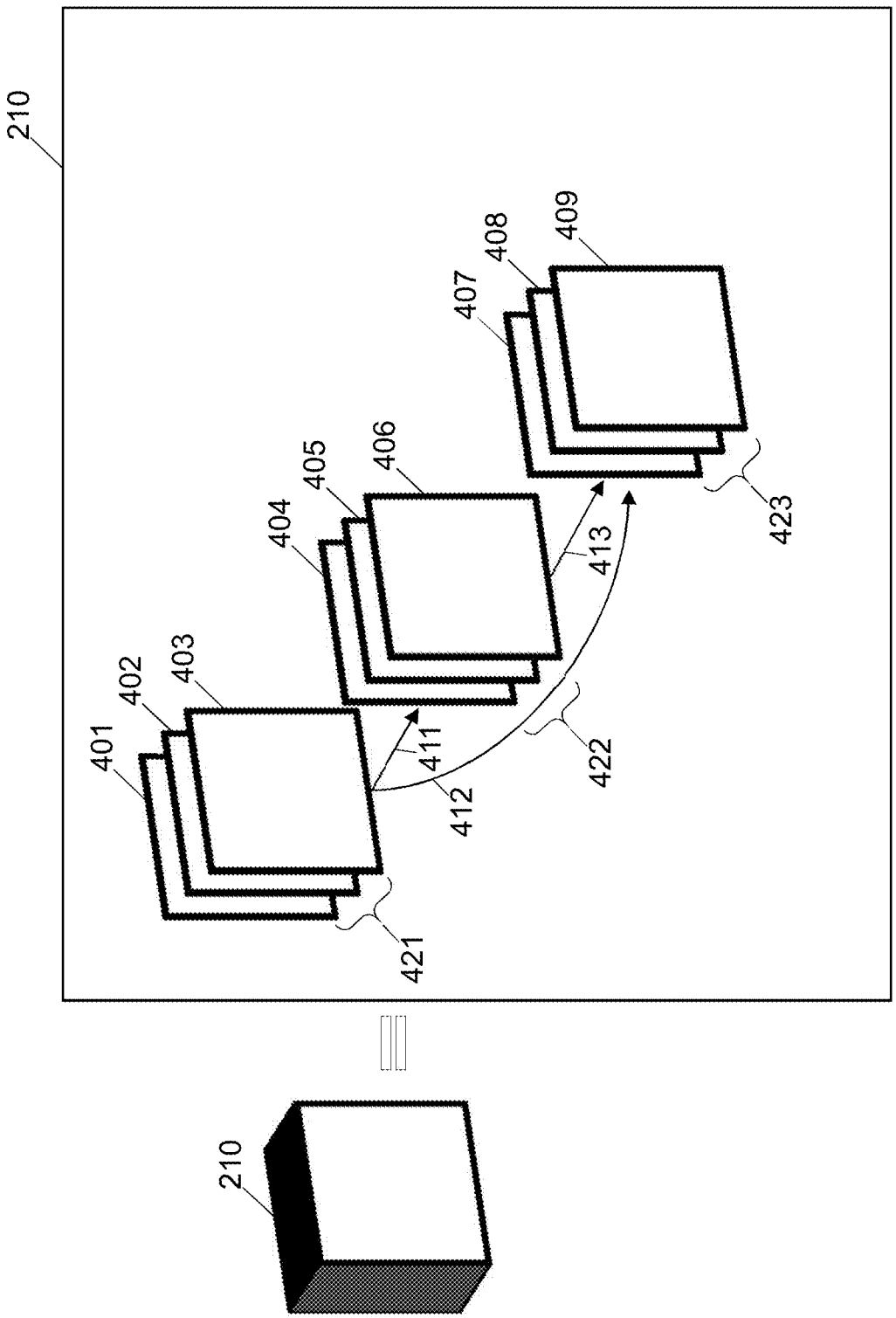

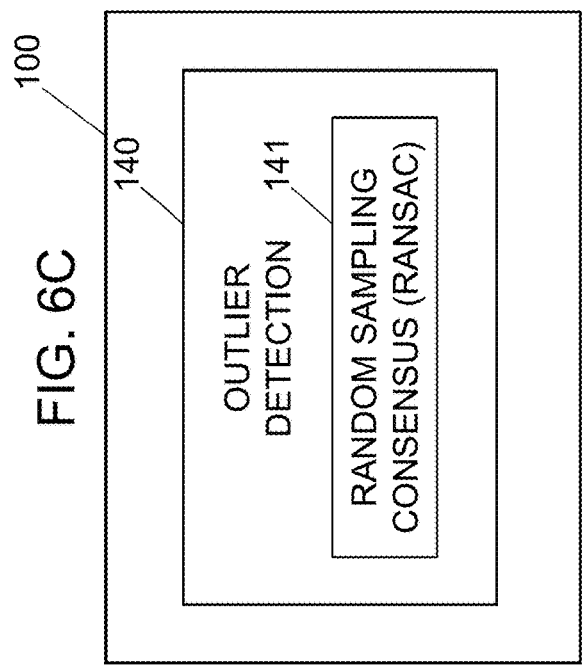
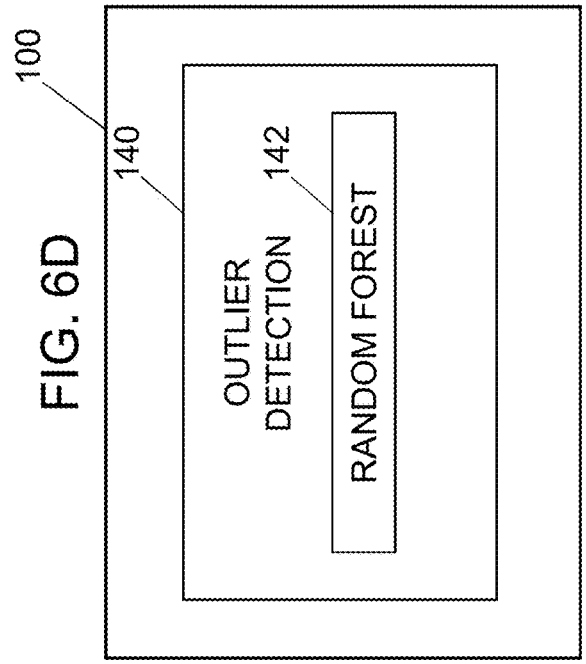
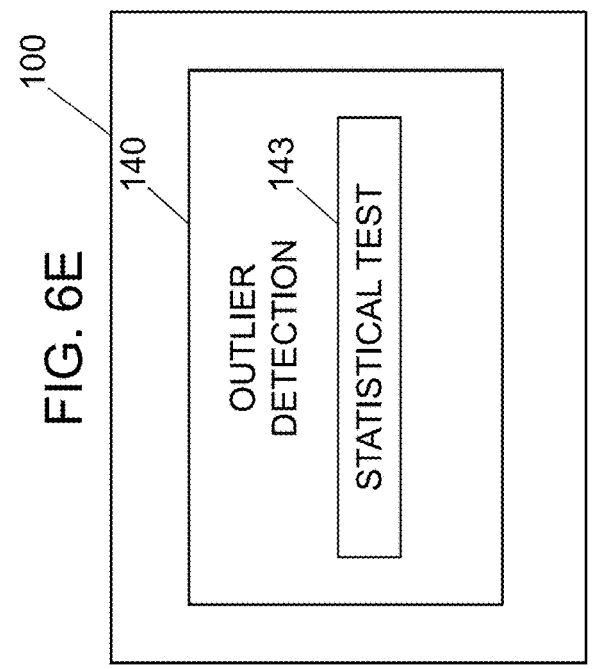
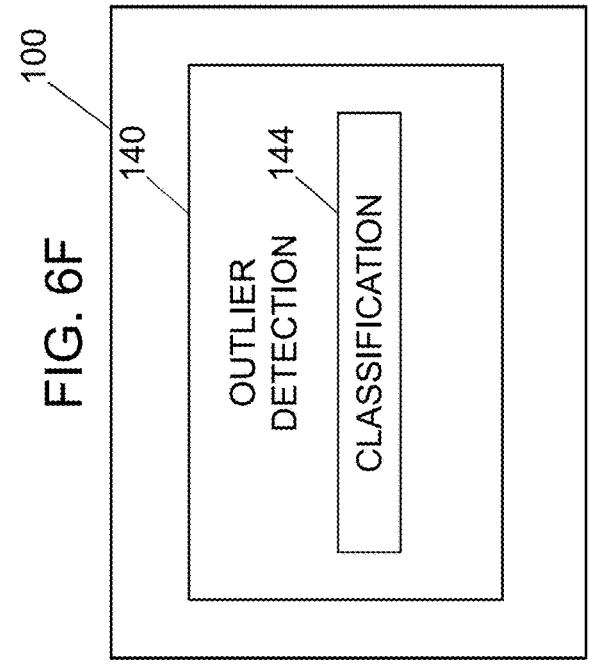

| | PROTOCOL | MANUFACTURER | SCANNER | INSTITUTION |
|---|---|---|---|---|
| DOMAIN A | T1w | SIEMENS | 1.5T | NYU |
| DOMAIN B | T2w | OTHERCO | OTHER SCANNER | BOSTON U. |

FIG. 8B

TARGET DETECTION IN LATENT SPACE

CROSS REFERENCE TO RELATED APPLICATIONS

This is a U.S. National Phase application of PCT/EP2017/078163 filed on Nov. 3, 2017 which claims priority to U.S. Provisional Application No. 62/487,000 filed on Apr. 19, 2017, the contents of which are hereby incorporated by reference.

FIELD

This disclosure relates generally to medical imaging and more specifically to magnetic resonance imaging.

BACKGROUND

MR is the modality of choice for assessing neurological diseases and tissue healthiness. Due to the large variety of sequences available, MR can support comprehensive analysis and can be implemented to characterize vascular, anatomical, diffusional and functional properties of pathologies and most importantly to characterize the appearance of a healthy brain scan.

Automatic detection of target tissue, such as abnormal tissue (e.g., pathologies in the form of tumors, lesions, structures such as metal implants/artifacts, or even imperfect/unusable slices) in imaging data has been a topic of interest for several years. Classical machine learning-based solutions are focused on modeling the target tissue (e.g., abnormality) to be detected.

Existing supervised learning solutions for computer aided diagnosis are tuned to identify a specific abnormality (e.g., stroke core/penumbra vs. normal brain, MS lesions versus normal brain, lung nodules versus normal lung, etc.). Hence these methods often involved (1) carefully designed features/biomarkers, (2) large amounts (e.g., hundreds to thousands) of annotated patient data for robustness, and (3) explicit modeling of the abnormality of interest, which may be very different from one subject to another. The large amounts of data may be particularly difficult requirement to obtain due to the scarcity of subjects with the specific target tissue, hence the value of patient data, i.e., data showing abnormalities.

SUMMARY

In some embodiments, a method for processing medical image data comprises: inputting medical image data to a variational autoencoder configured to reduce a dimensionality of the medical image data to a latent space having one or more latent variables with latent variable values, such that the latent variable values corresponding to an image with no tissue of a target tissue type fit within one or more clusters; determining a probability that the latent variable values corresponding to the medical image data fit within the one or more clusters based on the latent variable values; and determining that a tissue of the target tissue type is present in response to a determination that the medical image data have less than a threshold probability of fitting within any of the one or more clusters based on the latent variable values.

In some embodiments, a method for processing medical image data comprises: training a first neural network to determine whether an input medical image data contains any of one or more target tissue types, by using a set of training image data, the first neural network being configured to: reduce a dimensionality of the input medical image data to a latent space having a latent variable with latent variable values, and provide the latent variable values from the first neural network to a second neural network; and training the second neural network to classify the latent variable values according to one or more features defining a domain of the input medical image data, the second neural network configured to provide the domain of the input medical image data from the second neural network to the first neural network.

In some embodiments, a medical image system comprises a non-transitory, machine readable storage medium storing program instructions and medical image data; and a programmed processor coupled to the storage medium. The programmed processor is configured by the program instructions for: inputting medical image data to a variational autoencoder configured to reduce a dimensionality of the medical image data to a latent space having one or more latent variables with latent variable values, such that the latent variable values corresponding to an image with no tissue of a target type fit within one or more clusters of the values of the latent variables; detecting whether the latent variable values corresponding to the medical image data fit within the one or more clusters; and determining that a tissue abnormality is present in response to a determination that the medical image data have less than a threshold probability of fitting within any of the one or more clusters.

BRIEF DESCRIPTION OF THE DRAWINGS

FIG. 4 is a diagram of a dense block as shown in FIG. 3.

FIGS. 6C-6F are diagrams of various outlier detection mechanisms for the system of FIG. 1B.

FIG. 8B is a table showing examples of domains for which the system of FIG. 8A can be trained.

DETAILED DESCRIPTION

This description of the exemplary embodiments is intended to be read in connection with the accompanying drawings, which are to be considered part of the entire written description.

Tissue Detection Using Variational Autoencoders

This disclosure provides examples of systems and methods for detecting novelty (abnormality) in medical images using machine learning. In some embodiments, the detection is based on magnetic resonance (MR) images representing imaging data in a latent space (or lower-dimensional manifold) of variational autoencoders (VAEs). Outlier detection techniques can be applied to identify novel (i.e., abnormal) data.

Among the population of MR images acquired, the ratio of the number of scans from healthy subjects to the ones showing any apparent abnormality is very high. Therefore, having a framework that performs a generic assessment of healthiness (normality) can be valuable in reducing reading time, eliminating unnecessary referrals to health care specialists, and guiding therapy steps.

Manifold learning of medical images aims to project the original high-dimensional magnetic resonance (MR) data into a lower-dimensional nonlinear space, i.e., a (sub)manifold, where data/class separability is improved.

Variational autoencoders (VAEs) can represent input MR data in a latent space whose parameters are learned during encoding. A VAE can capture shape variability, and has generative capability to synthesize images of tissue (e.g., brain images) given the underlying latent space (or manifold) coordinates. An autoencoder is a feedforward, non-recurrent neural network having an input layer, an output layer and one or more hidden layers connecting the input and output layers. The output layer has the same number of nodes as the input layer.

In some embodiments, a system accepts multi-contrast MR data of a multitude of subjects, in which there are anatomical variations of the brains (in size and shape) that are related to age, gender, pathology (if present but not annotated), etc. The system first performs preprocessing (correction of artifacts such as intensity inhomogeneity, motion blur, noise, etc.) and data normalization. Then, full images or image patches (2D, 2.5D, or 3D) are fed into the encoder network of the VAE. The VAE can include an encoder network and a decoder network. The encoder network can have two or more convolutional layers with pooling. The encoder network maps input data into continuous latent variables, i.e., gets the parameters of distribution of the latent variables. Then samples are generated according to the learned parameters and fed into the decoder network to compute the loss, thereby completing the training.

Figures 5A, 5B, 5C, 5D:
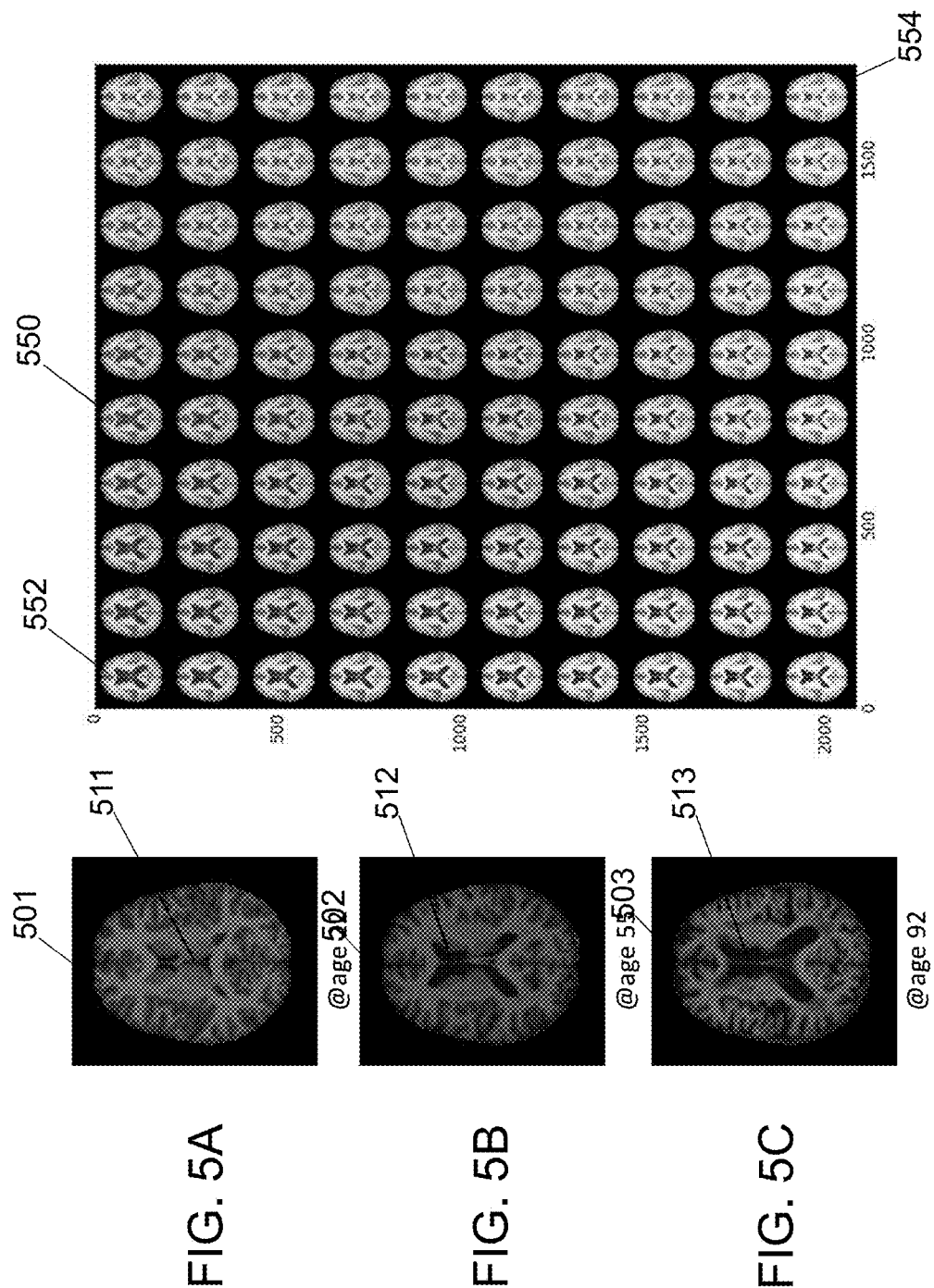
FIGS. 5A-5D show exemplary input images corresponding to brain slices of subjects in various age groups.

The latent variables are tuned to synthesize data that "looks" similar to the input data (An example on MNIST dataset can be found in FIG. 5D). This technique captures the shape variability within the data. In other words, in the manifold defined by the parameters of the latent variables, the images that look similar to each other (e.g., having ventricles of similar sizes) are closer to each other within the latent space, thereby forming "clusters" in the latent space, whereas images that look very different from any of the training images (e.g., images having lesions) will be "outliers" and do not fit into any of the clusters.

Because the learning is unsupervised, the training data have no annotation or supervision, and the training data determine whether any particular image constitutes an inlier or an outlier in an indirect manner. For example, if training is done using only brain images of subjects of ages between 20 and 30, then test images of healthy 80-year old subjects will be outliers. Thus, the training dataset should include many images from healthy patients in all of the demographic groups (e.g., age and sex) of the subjects to be imaged during the test phase. If the latent variables are learned using training data from healthy subjects with no apparent abnormality, then test images of patients with MS, mTBI, stroke, glioblastoma, or the like will be outliers (i.e., novel when compared to the training data).

The system applies outlier detection (and rejection) techniques to identify the deviations or abnormalities in the medical imaging data. A variety of outlier detection methods can be used to provide a low-dimensional vector representation of the images in the latent space, ranging from statistical tests to distance-based approaches. Some embodiments use random sample consensus (RANSAC), a robust method, for outlier detection. Also, the learned manifold can be used to analyze non-imaging data (clinical parameters obtained from additional tests on patients) accompanying the imaging data.

Figure 1A:
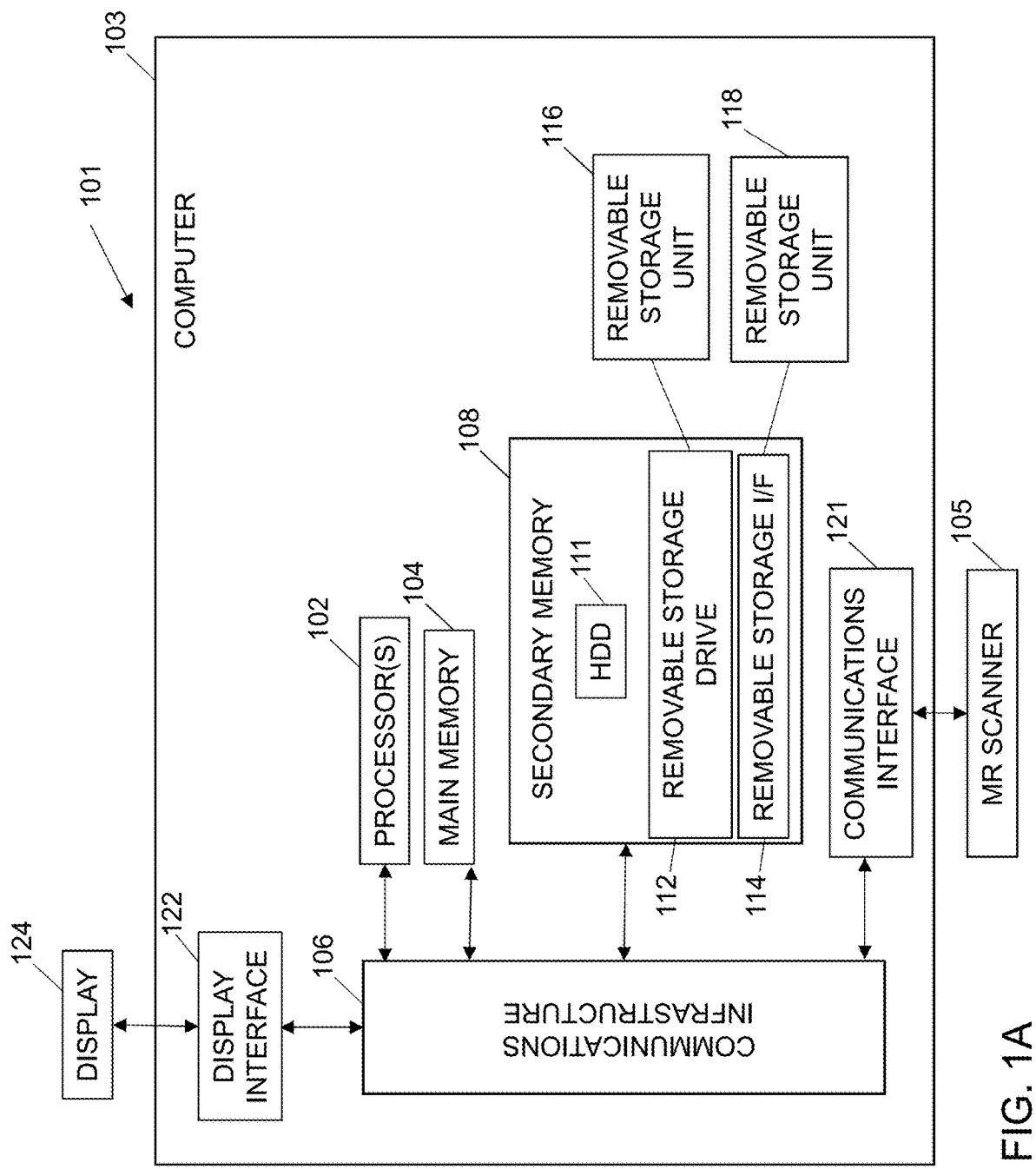
FIG. 1A is a diagram of an exemplary magnetic resonance (MR) image processing system.

FIG. 1A is a block diagram of a system 101 including the scanner 105 and a computer system 103. The computer system 103 can be used in some embodiments, e.g., for implementing the processor controlling the scanner 105. Computer system 103 may include one or more processors 102. Each processor 102 is connected to a communication infrastructure 106 (e.g., a communications bus, cross-over bar, or network). The processor 103 can be implemented as a central processing unit, an embedded processor or microcontroller, or an application-specific integrated circuit (ASIC). Computer system 103 may include a display interface 122 that forwards graphics, text, and other data from the communication infrastructure 106 (or from a frame buffer, not shown) for display on the display unit 124 to a user. The processor is coupled to one or more non-transitory, machine readable storage media and is configured by program instructions to operate as a special purpose computer configured for performing computations described below.

Computer system 103 may also include a main memory 104 (e.g., a random access memory (RAM)), and a secondary memory 108. The main memory 104 and/or the secondary memory 108 comprise a dynamic random access memory (DRAM). The secondary memory 108 may include, for example, a hard disk drive (HDD) 111 and/or removable storage drive 112, which may represent a solid state memory, an optical disk drive, a flash drive, a magnetic tape drive, or the like. The removable storage drive 112 reads from and/or writes to a removable storage unit 116. Removable storage unit 116 may be an optical disk, magnetic disk, floppy disk, magnetic tape, or the like. The removable storage unit 116 may include a computer readable storage medium having tangibly stored therein (or embodied thereon) data and/or computer software instructions, e.g., for causing the processor(s) to perform various operations.

In alternative embodiments, secondary memory 108 may include other devices for allowing computer programs or other instructions to be loaded into computer system 103. Secondary memory 108 may include a removable storage unit 118 and a corresponding removable storage interface 114, which may be similar to removable storage drive 112, with its own removable storage unit 116. Examples of such removable storage units include, but are not limited to, universal serial bus (USB) or flash drives, which allow software and data to be transferred from the removable storage unit 116, 118 to computer system 103.

Computer system 103 may also include a communications interface (e.g., networking interface) 121. Communications interface 121 allows instructions and data to be transferred between computer system 103 and scanner 105. Communications interface 121 also provides communications with other external devices. Examples of communications interface 121 may include a modem, Ethernet interface, wireless network interface (e.g., radio frequency, IEEE 802.11 interface, BLUETOOTH (short-range UHF radio) interface, or the like), a Personal Computer Memory Card International Association (PCMCIA) slot and card, or the like. Instructions and data transferred via communications interface 121 may be in the form of signals, which may be electronic, electromagnetic, optical, or the like that are capable of being received by communications interface 121. These signals may be provided to communications interface 121 via a communications path (e.g., channel), which may be implemented using wire, cable, fiber optics, a telephone line, a cellular link, a radio frequency (RF) link and other communication channels.

Figure 1B:
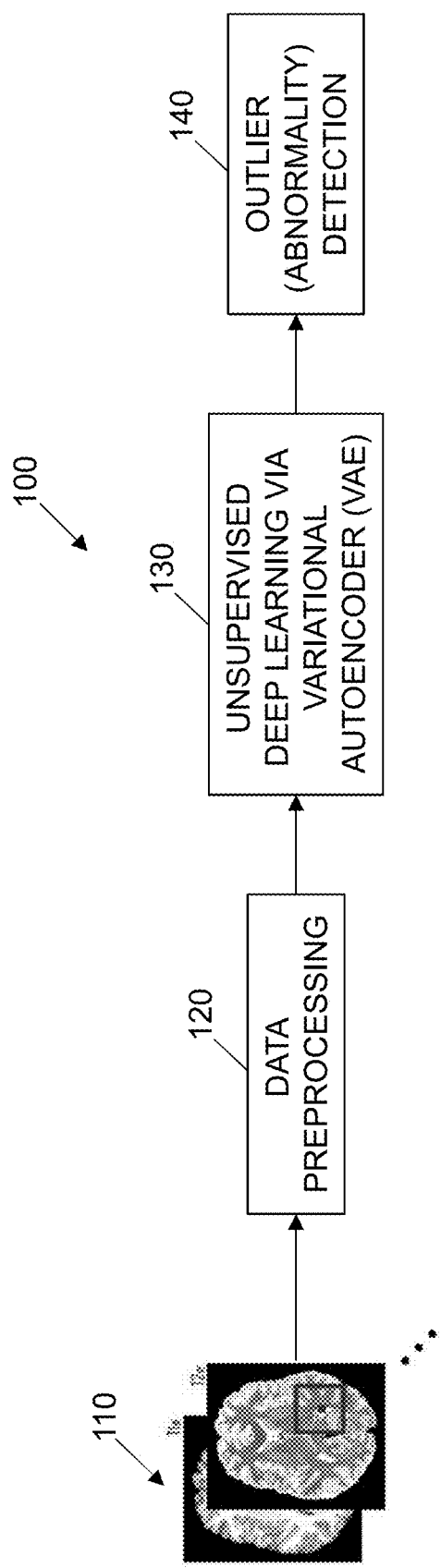
FIG. 1B is a block diagram of a system for training the MR image processing system of FIG. 1A.

FIG. 1B is a diagram of a method 100 for detecting target tissue (e.g., abnormalities) in medical image data, such as MR image data.

Image set 110 provides a training set of MR image data from patients who do not have the target tissue to be detected. For example, if the system is to be trained for detecting abnormalities, the training set of images 100 include a plurality of normal/healthy patients without the target abnormality. The target abnormalities can be any one or more of tumors, lesions, structures (e.g., metal implants/artifacts), imperfect/unusable slices, stroke core/penumbra, MS lesions, lung nodules, etc. In some embodiments, the images include T1 weighted (T1w) and T2 weighted (T2w) images. Although the images shown in FIG. 1B are brain images, the training image set can have images of other organs to be imaged, such as heart, lungs, kidneys, liver, etc.

Block 120 is a data preprocessing module. The preprocessing can include one or more of bias field correction (BFC), denoising, skull stripping (removal of the skull and other non-brain tissue from images of the head), image normalization, or additional processing for diffusion and perfusion data, if available.

Block 130 performs unsupervised deep learning using a variational autoencoder (VAE). A large amount of training image data (from image set 110) are received without annotation. The user-defined indirect supervision includes a variety of samples of the organs of interest from all demographic groups (e.g., age groups, gender) for which the system will be used. The subjects in the sample do not have the target tissue to be detected. For example, if the system will be used to detect tumors, lesions, implants, stroke core/penumbra, MS lesions, or lung nodules, then none of the training images has a tumor, lesion, implant, stroke core/penumbra, MS lesion, or lung nodule. If the system will be used to discard poor quality images, then all the training images should be good quality images.

Block 140 detects abnormalities as outliers. A variety of outlier detection techniques can be used, such as statistical tests, classification mechanisms (e.g., support vector machine (SVM), random forests (RFs), etc.), or vision-based techniques (e.g., random sample consensus, RANSAC). As noted above, based on the selection of images for the training data set, any image having the target tissue type is identified as an outlier in block 140.

Figure 2:
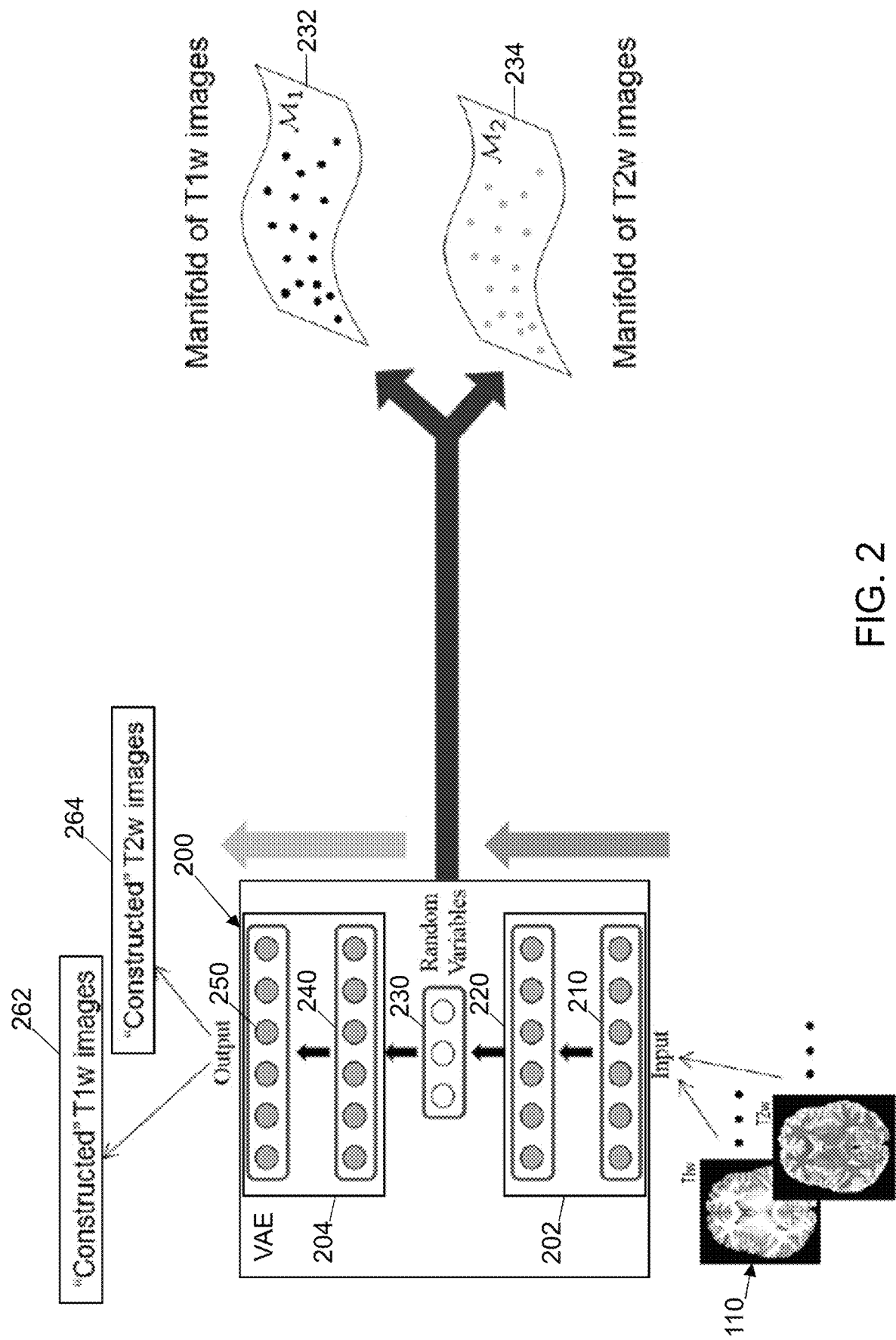
FIG. 2 is a block diagram of an embodiment of a processing system for detecting abnormal tissue.

FIG. 2 is a schematic diagram of a system for performing target detection.

The system includes a variational autoencoder (VAE) 200. The VAE 200 performs deep unsupervised learning based on the training image set 110 discussed above. For example, the VAE 200 can include an encoder network 202 and a decoder network 204. The encoder network 202 has a plurality of layers 210, 220, and the decoder network 204 has a plurality of layers 240, 250. The layers 210, 220, 240 and 250 are described below with reference to FIGS. 3 and 4, below. The encoder network 202 learns the parameters of distribution (e.g., mean μ and standard deviation σ) of a set of latent variables 230. For example, if the training image data include T1w images and T2w images, the encoder 202 transforms the T1w input images into a manifold (M1) 232 representing a reduced dimensionality variable set for T1w images, and transforms the T2w input images into a manifold (M2) 234 representing a reduced dimensionality variable set for T2w images. The decoder network 204 reconstructs the output images 262, 264 from the latent variables 230 and computes the loss based on the input image data 110 and the output images 262, 264. The kernels of encoder network 202 and decoder network 204 are computed to minimize the loss.

After completion of training, test images of a subject (e.g., an image of a patient's brain) are input to the encoder of the VAE 200 to generate the latent variable values corresponding to the input test image in the manifolds 232, 234. An outlier detection technique is used to determine whether the test image has the target tissue.

Figure 3:
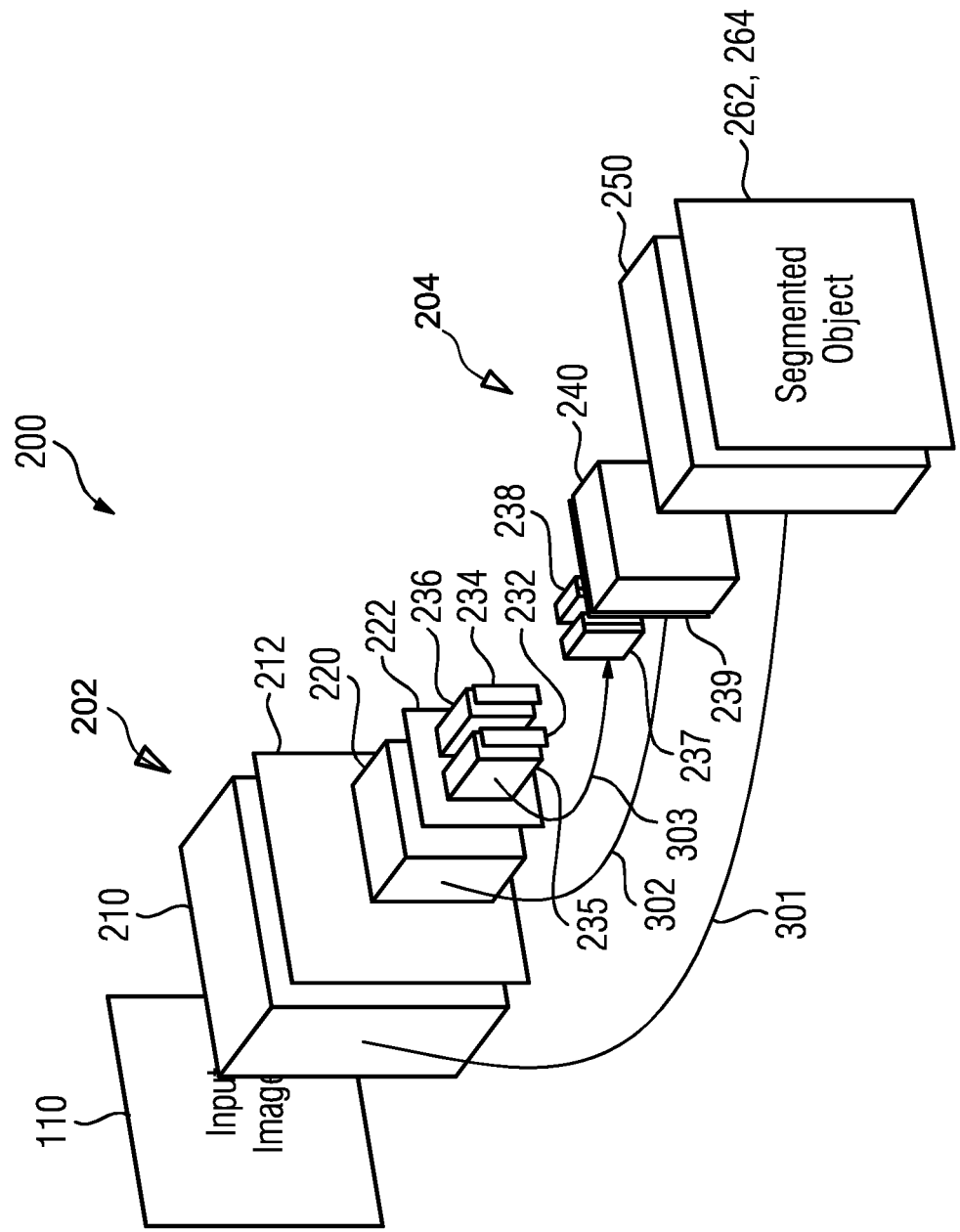
FIG. 3 is a diagram of the variational autoencoder of FIG. 2.

FIG. 3 is a schematic diagram of a VAE 200 according to some embodiments. The encoder 202 of VAE 200 has three dense block layers 210, 220, and 235-236. Each of the dense block layers 210, 220, and 235-236 has a plurality of convolutions with a growth rate of 12 filters per layer. The encoder 202 has two pooling layers 212 and 222. The latent variable space has lower dimensionality than the input space, so the latent variable vector can be regarded as a compressed representation of the input. The representation output by the pooling layer 212 is more compressed than the input image 110, and the representation output by the pooling layer 222 is more compressed than the output of the pooling layer 212.

The decoder 204 of VAE 200 has three dense block layers 237-238, 240, and 250 for reconstructing the input images. Each of the dense block layers 237-238, 240, and 250 has a plurality of deconvolutions with 12 filters per layer for regenerating the image data. The decoder 204 has regenerative layers 212 and 222 FIG. 3 also shows skip connection 301, 302, 303 between dense blocks 210 and 250, between dense blocks 220 and 240, and between blocks 235/236 and corresponding blocks 237 and 238. The skip connections 301, 302, and 303 feed forward the high resolution information in each convolution layer of the encoder 202 to the corresponding deconvolution layer in the decoder. Because back propagation (to update the higher encoder layers) is based on gradient functions that may tend to zero, keeping the high resolution information from the skip connections 301, 302, 303 allows deeper training without loss of high frequency details.

At the smallest (deepest) level, also referred to as the "bottleneck" of the network, the latent space has two manifolds 232, 234 corresponding to two latent variables. These two latent variables can represent different sets of parameters of the tissue.

FIG. 4 shows details of one of the dense blocks 210. FIG. 4 is only exemplary, and each of the other dense blocks 220, 235, 236, 237, 238, 240 and 250 can have the same schematic design as shown in FIG. 4. The dense block 210 has three layers 421, 422, 423. Layer 421 has a batch normalization block 401, a three-dimensional (3D) convolution 402, and activation function 403. Layer 422 has a batch normalization block 404, a 3D convolution 405, and activation function 406. Layer 423 has a batch normalization block 407, a 3D convolution 408, and activation function 409. The activation functions 403, 406, and 409 can be a rectified linear unit (ReLU) using rectifier defined by equation (1)

$$f(x) = \max(0, x) \tag{1}$$

where x is the input to the layer.

Alternatively, the activation function can be leaky ReLU, which allows a small, non-zero gradient when the leaky ReLU is not active. The leaky ReLU function can be expressed by equation (2).

$$f(x) = \begin{cases} x & \text{if } x > 0 \\ 0.01x & \text{if } x \leq 0 \end{cases} \tag{2}$$

Although the example of FIG. 4 shows three layers (e.g. 401-403) per dense block (e.g., 421), each dense block can have any desired number of layers, depending on the complexity of the images to be processed. For example, other embodiments (not shown) may have four, five, or six layers per dense block for processing more complex images. Additional layers (of convolution or filtering) can augment the level of abstraction in the representation of the image data. The more layers per dense block, the more features the VAE 200 can learn.

Each dense block 210 also includes skip connections 411-413 between layers. Each lower layer 412 or 413 receives input from the adjacent higher layer 411 or 412 and the original input. For example, the input of block 413 is the output of the block 411 and block 412 concatenated to one input. This provides a more accurate result using feedforward, to keep high resolution information when pooling. The pooling provides an average or maximum of the data, and replaces a neighborhood with a single value, approximating the higher resolution data. So pooling could potentially lose information. By passing the result of the previous layers to the next layer along with the pooled data, the high resolution information is still propagated.

In the example, the growth rate is 12 additional filters at each level, for example, starting with six filters at the first dense block 421. The second dense block 422 adds 12 filters. Then the third dense block 423 adds another 12 filters, totaling 30 filters. The number of filters represents how wide the network is, and how many abstract features can be extracted. Each filter creates a corresponding set of abstract features. The more filters, the more abstract features are extracted by the network.

Although a detailed example of a VAE is provided above, any type of deep generative network that is able to provide a lower-dimensional representation of the data can be substituted for the VAE.

FIGS. 5A-5D show examples of training data for the VAE 200. The training data includes image information obtained from normal, healthy subjects (e.g., patients), who do not have any tissue of the target tissue type (e.g., lesion or tumor). The training data should broadly encapsulate a large variety of shape and intensity variations. For example, FIG. 5A shows a brain 501 of a healthy 22-year-old subject, having ventricles 511. FIG. 5B shows a brain 502 of a healthy 55-year-old subject, having ventricles 512, which are larger than ventricles 511. FIG. 5A shows a brain 503 of a healthy 92-year-old subject, having ventricles 513, which are larger than ventricles 512. Thus, the size of the ventricles in normal, healthy subjects are based at least in part on the subject's age. The older the subject, the larger the dark ventricles are, relative to the comparatively light white matter.

Based on this relationship, there is a variation between brains of different age groups that can result in a corresponding variation in mean light intensity $\mu$. Another difference among the brains in the sample 550 is the standard deviation $\sigma$ of the light intensity. The brains of older subjects have a greater variance in light intensity than the younger subjects, and corresponding larger standard deviation $\sigma$. Thus, an example of a set of two latent variables that can characterize the brain images is mean light intensity $\mu$ and standard deviation $\sigma$ of the light intensity. This is just one example, and the encoder 202 can define other sets of latent variables, depending on the properties of the supervised training sample.

FIG. 5D shows a training image set 550 of brains, including brains from subjects throughout the relevant range of ages. The brains vary in average mean intensity $\mu$ from the darkest brain 552 having the largest ventricles to the lightest brain 554 having the smallest ventricles. The brains also vary in standard deviation $\sigma$ of light intensity, from the brain 552 having the largest ventricles and largest standard deviation $\sigma$ to the lightest brain 554 having the smallest ventricles and smallest standard deviation $\sigma$.

Figure 6B:
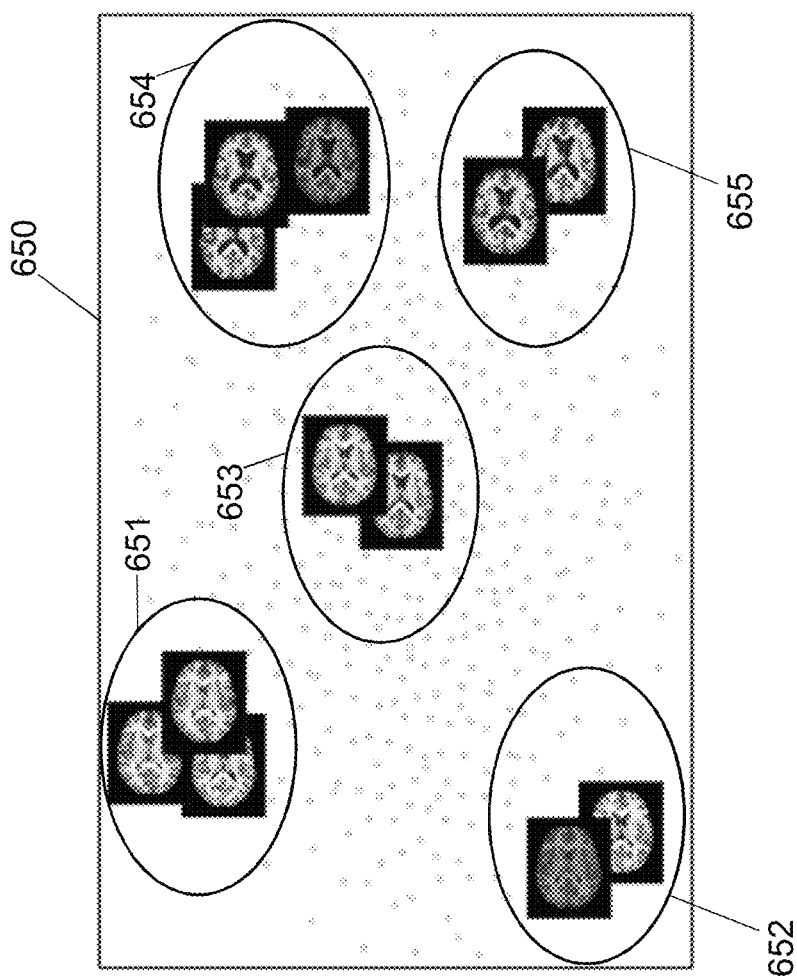
FIG. 6B is a diagram showing clustering of latent variable values in the latent variable space.
Figure 6A:
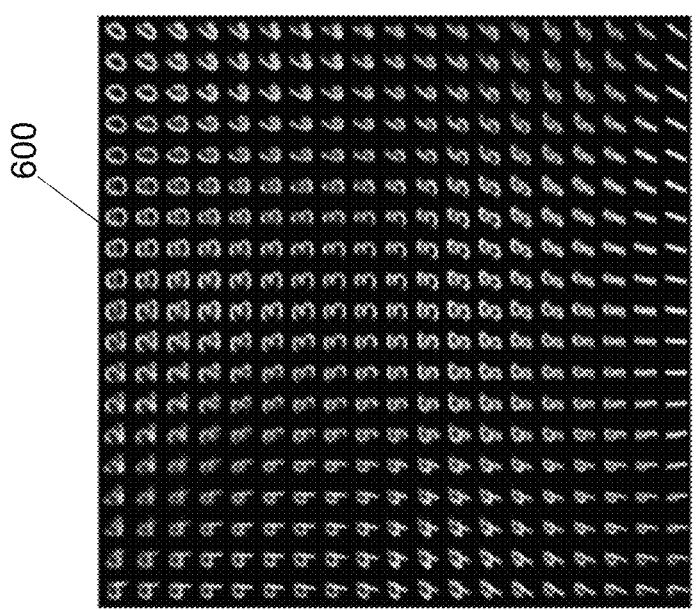
FIG. 6A is a diagram of latent variables corresponding to a training image set.

FIG. 6A is a plot of the shape variability in binary images of digits, based on the latent variable data output by the encoder. FIG. 6A shows the scope of the variation of the digits along the latent space. If a digit is generated for each value or set of values in the latent space, the image of FIG. 6A results. The variation is determined by the training set of data.

FIG. 6B is a diagram of the two latent variables, plotted on a Cartesian plane representing the latent space manifold 650. In cases where there are more than two latent variables, the latent variables are represented in a multidimensional space. A clustering step is performed, to identify which brains are closer to each other. A variety of clustering methods can be used, such as a k-means algorithm. Because the VAE 200 is trained using only normal, healthy subjects (without the target tissue), the latent variable values corresponding to an image with no tissue of a target tissue type will fit within one or more of the clusters. The latent variable values corresponding to an image having the target tissue type (e.g., lesion or tumor) will not fit within any of the clusters, and will be an outlier.

The data in the latent space 650 manifold are sparse. The latent variable values can fall in clusters 651-655, as shown in FIG. 6B. The latent space 650 represents a compact representation of data (in terms of dimensionality). This manifold provides a representation of the data in FIGS. 5D and 6A. The axes in the manifold 650 correspond to the latent variables (e.g., mean light intensity μ and standard deviation σ of the light intensity), which can be complex functions of the input image parameters. Each axis in the latent space can be a function of many input image parameters. FIG. 6B shows specific clustering of data into the clusters 651-655. For example, the cluster 651 may correspond to non-smoking, low-cholesterol subjects between 20 and 30 years old, and cluster 655 may correspond to smoking high-cholesterol older than 85 years old.

After training the system, a brain image of a given test subject can be transformed by the encoder 202 into the latent variables, and the outlier detection block 140 (FIG. 1B) in system 100 (FIG. 1B) can determine whether the test subject is an inlier or an outlier. The outlier detection block 140 can determine a probability that the latent variable values corresponding to test medical image data fit within the one or more of the clusters 651-655 based on the latent variable values. For example, the outlier detection block 140 in the system 100 can be a random sampling consensus (RANSAC) block 141 (FIG. 6C), a random forest block 142 (FIG. 6D), a statistical test engine 143 (FIG. 6E) or a classification block 144 (FIG. 6E).

In some embodiments, the outlier detection block can determine that a tissue of the target tissue type is present in response to a determination that the medical image data have less than a threshold probability of fitting within any of the one or more clusters based on the latent variable values. For example, a lesion in the test subject's brain may appear as a dark region in an MR image, and may result in a combination of mean intensity μ and standard deviation σ that is outside all of the clusters 651-655. If the latent variable values have a high probability of falling within one of the clusters of normal healthy tissue, a processor can determine that additional testing for the patient is a low priority. When the latent variable values are "off the charts" (e.g., the latent variable value for the brain image differs from the mean μ of any cluster by more than 3σ), the processor can quickly flag the patient for additional testing.

In other embodiments, the processor can add a second criterion before determining that the target tissue (e.g., lesion or tumor) is not present. For example, the input images can be clustered or grouped by an input parameter, such as age. By comparing clusters according to age against clusters according to latent variables, the processor can determine the salience of the input parameter with respect to the latent variables. For example, the processor can determine the latent variable values of a test subject having a given input parameter value. The processor can identify a subset of training images having a range of input parameter values encompassing the input parameter value of the test subject, and the processor can identify the latent variable values corresponding to that subset of training images. The processor can compare the test subject's latent variable values to the distribution of latent variable values in the subset of training subjects. Then, the system can determine the probability that the subject has an abnormal condition within that range. For example, based on the mean and standard deviation of the latent variables of the subset and an assumed probability distribution (e.g., Gaussian), the processor can determine the probability that the subject's latent variable value is a normal member of that subset or an outlier.

For example, the processor clusters the training image data into a set of second clusters in the latent variables based on values of an input parameter, and determines a probability that a subject having a subject input parameter value also has a latent variable value that fits within one of the set of second clusters corresponding to the subject input parameter value. In one example, the data can be represented by an input parameter (e.g., age) along one axis, and one of the latent variables along the other axis. For each image, the processor can plot two corresponding points having the coordinates <age, latent variable 1> and <age, latent variable 2> on respective graphs. The resulting plots will show the data falling into clusters according to age. If the latent variable value for a 22-year-old test subject lies within the cluster corresponding to 85+ year old subjects, then an abnormality is detected, even though the data for that subject fall within one of the latent variable clusters. In other words, the subject's image is in the wrong cluster, and is an outlier relative to her own age group.

Figure 7:
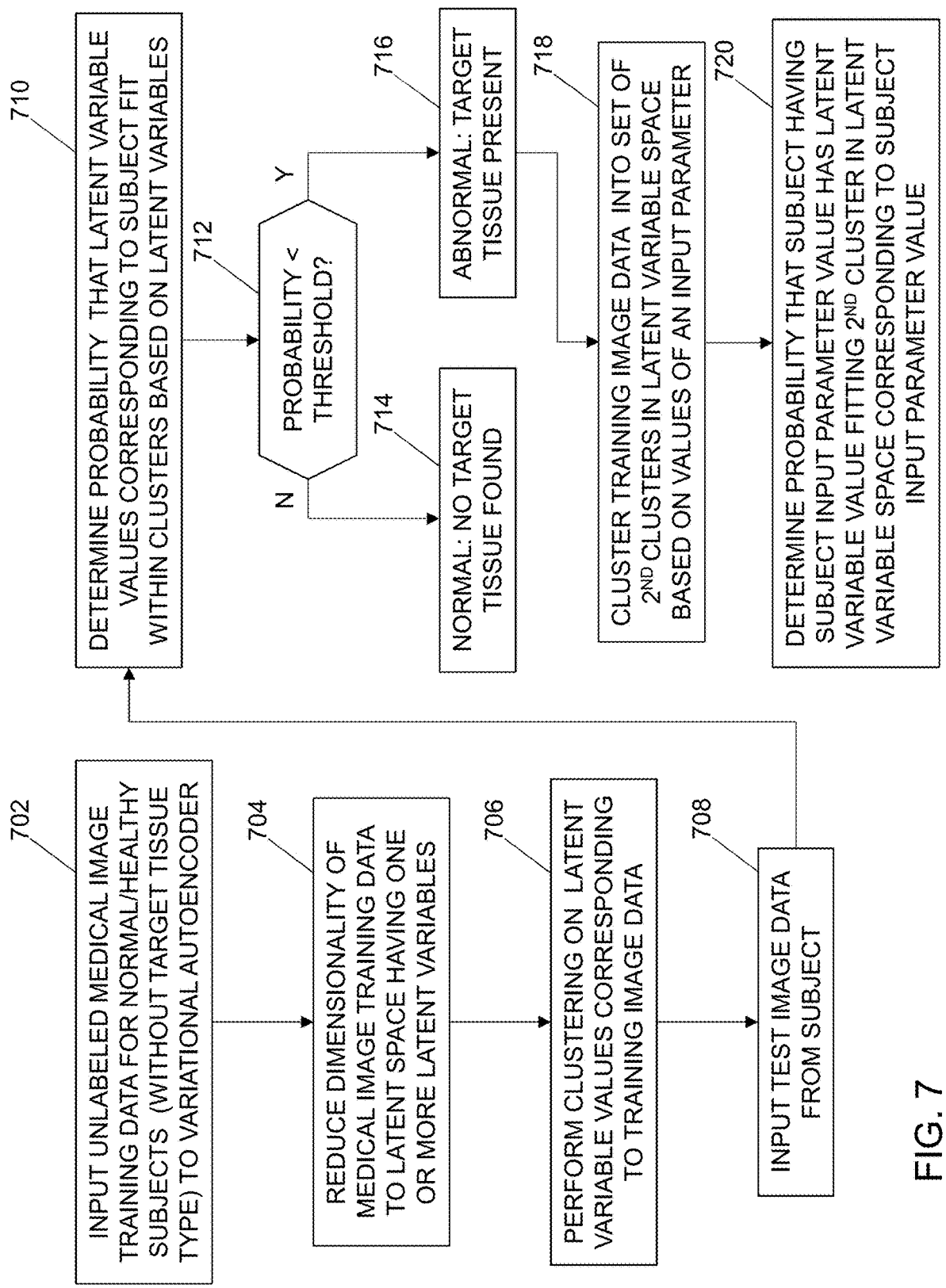
FIG. 7 is a flow chart of the method of training the system of FIG. 1A.

FIG. 7 is a flow chart of a method of using the system described above.

At step 702, a set of unlabeled medical image training data from normal, healthy subjects (without the target tissue type) are input to a VAE. In some embodiments, the images are MR images. The images can be selected from a cross-section of patients throughout the expected range of each relevant input parameter. For example, the training data set can span a variety of ages, gender, smoking habits, height, weight, etc. In some embodiments, the images show brains, heart, lungs, kidneys, liver, or other tissue.

At step 704, a first neural network is trained to determine whether an input medical image data contains any of one or more target tissue types, by using the set of training image data. The encoder of the VAE reduces the dimensionality of the medical image training data to a latent space having one or more latent variables. In some embodiments, the images are brain slices, and the latent variables are the mean μ and standard deviation σ of light intensity in the image. In other embodiments, the encoder determines other latent variables.

At step 706, the processor performs clustering on the latent variable values corresponding to the training image data.

At step 708, image data from a test subject are input.

At step 710, the encoder computes the latent variable values for the input image from the test subject. The processor then determines the probability that the latent variable values of the test subject fit within any of the clusters based on the latent variables. If the probability is greater than or equal to a predetermined threshold value, step 714 is performed. If the probability is less than a predetermined threshold value, step 716 is performed.

At step 714, the processor determines that no target tissue has been detected. The subject is considered to be within the normal range. The processor can output an indication that the subject is not considered a high priority candidate for additional testing to detect the target tissue.

At step 716, the processor determines that a target tissue has been detected. In some embodiments, the system is trained to provide an alert that a target tissue has been found, and the subject should undergo additional testing to determine which kind of tissue has been found. The processor can output an indication that the subject is considered a high priority candidate for additional testing to detect the target tissue, and may identify additional MR sequences to be performed, or initiate scheduling of an appointment. The subject is considered to be outside the normal, healthy range of training subjects.

At step 718, the training image data are clustered into a second set of clusters in the latent variable space, based on values of an input parameter. For example, the training images can be clustered according to age, and the points identifying latent variable values in one or more of the clusters can be plotted, so that the cluster with which each point belongs is identified. The test image can be compared to the latent variable data for the cluster of normal training images for the subject's cluster. Then the subject can be identified as normal or abnormal.

At step 720, the processor can determine the probability that the subject having a given subject input parameter value (e.g., age) has a latent variable value fitting a second cluster in the latent variable space corresponding to the subject input parameter value.

For example, a point corresponding to each training image can have coordinates of an input parameter value (e.g., age) along the horizontal axis and the mean light intensity μ along the Y axis. The processor can determine which cluster the subject fits in. For example, the processor can determine that a 22-year-old subject has latent variable values that would be normal for an 85 year-old.

The system and method of FIGS. 1-7 can provide several features. There is no need for annotated training data. Unlabeled training data for normal, healthy subjects can be used, so the population from which the training data can be taken is large; there are many "normal", healthy subjects, relatively fewer "abnormal" subjects having abnormal tissue growth. The training data can be collected at any time after the MR training images are reconstructed, and the subject's MR image can be analyzed at any time after the subject's image is reconstructed. The method can be used irrespective of the type of MR scanner and/or imaging sequence, and can be used for a variety of clinical applications.

In some embodiments, the method and system can be used immediately after the reconstruction of the test subject's MRI image, to provide an immediate indication as to whether further imaging or testing should be performed. For example, the method can be used for diagnostic classification (e.g., healthy vs. diseased) for a variety of brain conditions (e.g., MS, stroke, mTBI, tumors, etc.).

Additionally, the method can be used to provide an immediate image quality assessment, to determine whether a collected test image has good quality or poor quality (i.e., images with artifacts). Whether the system designates an image as "abnormal" based on the detection of novel tissue and/or based on poor image quality is determined by the training set and how the loss that drives the training is defined. In some embodiments, the loss can be multi-task to provide additional information about the outlier state with a classification between diseased or healthy and poor or bad image quality.

Adversarial Training with Domain Adaptation

Figure 8A:
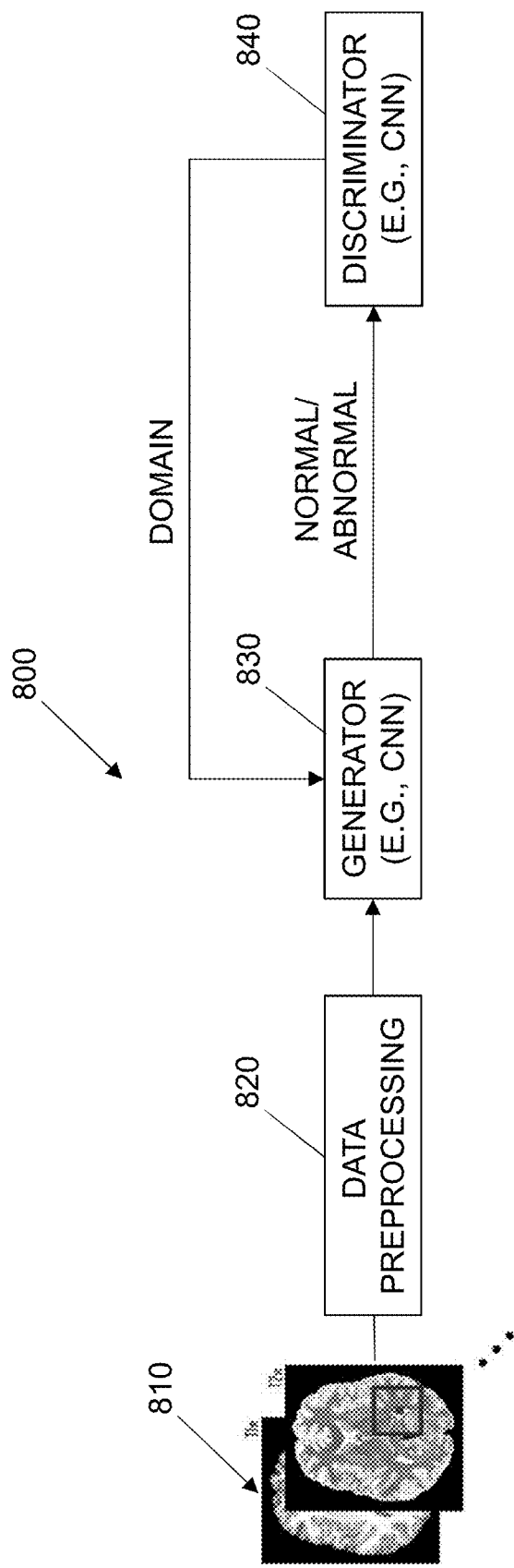
FIG. 8A is a block diagram of a system for training an MR image processing system using adversarial training using domain adaptation.

FIG. 8A is a block diagram of another embodiment which uses generative adversarial training for domain adaptation, in order to reduce false negatives (i.e., to reduce failures to identify abnormal subjects). The system of FIG. 8A can be implemented using the hardware configuration of FIG. 1A, with changes to software.

The system 800 uses multi-parametric data for analysis of tissues. The system 800 can provide quality abnormality detection based on images acquired using a variety of basic protocols (e.g., T1-weighted, T2-weighted, Fluid-attenuated inversion recovery (FLAIR), or Diffusion weighted MR imaging (DWI) sequences) for neurological assessment, each providing specific information. The system 800 can include neural networks 830, 840 (e.g., residual networks (ResNet) or densely connected convolutional networks (DenseNet)) to learn latent spaces that are representative of images acquired by the various protocols. The neural networks 830, 840 use labeled training images from the various protocols to classify the data accordingly. These training images can originate from either the full scans or from the brain regions and non-brain regions separately, in which case, the latent space variable values from full scans and brain scans can be concatenated for classification. Alternatively, the latent variable values from full scans and brain scans can be used separately.

The networks 830, 840 can use skip connections throughout the network to allow deep to very deep network construction while minimizing overfitting during training. A direct consequence is that classification from such learned descriptors is more accurate. In some embodiment, such directly supervised networks use the full brain volume or subsets of the brain as (large) inputs. The trained network then provides an abnormal/normal flag for the full volume or subsets. If flags are provided for subsets of the data, the scores are aggregated over the brain subsets to provide a final result on the presence of an abnormality. The method includes supervised learning, using a large number of images with labels (e.g., 0 for normal scans, 1 for abnormal scans).

To compensate for the discrepancies in protocols between scanners, institutions, vendors, and/or models, system 800 uses adversarial training to create features for classification that are robust and nearly invariant to protocols. That is, the system 800 can classify a given input image as normal or abnormal regardless of the acquisition protocol. The configuration in FIG. 8A branches out a discriminator network (also referred to as "discriminator") 840 from the latent space. The discriminator 840 can identify the protocol being used (or the institution the image comes from, or the vendor and/or model). The training is performed using at least two different batches of data. The first batch of data trains a generative network (also referred to as a generator) 830 for the normal/abnormal classification, using labeled (normal and abnormal) images for supervised learning. All of the training images in the first batch are acquired using the same protocol as each other (e.g., referred to below as "domain A").

The second batch of training images contain data from two or more domains, referred to herein as "Domain A" and "Domain B." Domains A and B can represent two different acquisition protocols, for example. The second batch of data includes both normal and abnormal images from each of the domains. The second batch of data are labeled to identify their acquisition domain, but their labels do not identify whether the image is normal or abnormal. FIG. 8B is a table showing examples of domains. If the domain represents the protocol, Domain A can be T1w and Domain B can be T2w. If the domain represents a scanner vendor or manufacturer, Domain A can be Siemens, and Domain B can be another vendor. If the domain represents a model number, Domain A can be Siemens 1.5 T, and Domain B can be another model. If the domain represents an institution, Domain A can be NYU, and Domain B can be Boston University. These values are only exemplary. The domain may be another attribute of the source of the acquired data. Also, other protocols, vendors, models and institutions can be used.

The method shown in FIG. 8A uses a first network (e.g., generator) 830 for the classification of normal versus abnormal cases (or normal vs a plurality of classes of abnormal) by exploiting the image labels derived from radiology reports or discharge data. The encoder of the generator transforms the images to a latent space. The generator provides a set of matrices (feature maps) to a second network (e.g., discriminator 840) configured to learn which of a plurality of domains the input come from. The second network 840 feeds the domain information back to the generator. The first network 830 learns to make the normal/abnormal determination regardless of the domain from which the input image is provided.

The technique assumes that a domain-invariant latent space can be learned through domain adaptation. The generator learns to map from the latent variables to the image distribution regardless of the domain from which the image is collected. Thus, the generator tries to generate domain-invariant latent variable values for regenerating the images in the decoder, to increase the error rate in the discriminator when determining from which domain the image it receives was acquired.

The system 800 uses a training image set 810 different from the training image set 110 described above. The training image set 810 uses labeled images. The training images are divided into two subsets.

The training images in the first subset contains both images of normal, healthy tissue and abnormal tissue. The first subset of images are labeled to identify whether the image is normal or abnormal (i.e., whether the image contains a target tissue). The images in the first set are all from a single domain (e.g., domain A).

In some embodiments, the target tissue can be any of the abnormalities discussed above (e.g., tumors, lesions, implants, stroke core/penumbra, MS lesions, or lung nodules). Alternatively, because the data are labeled, the target tissue can be more specific (e.g., tumors). In other embodiments, the target tissue can be a type of tissue found in a normal, healthy patient.

The domain can identify one of a plurality of sources from which the training input images are provided. For example, the images may have been captured using different protocols. In some embodiments, the training input images may be captured using T1w, T2w, Fluid-attenuated inversion recovery (FLAIR), or Diffusion weighted MR imaging (DWI).

T1w uses T1 weighted images (i.e., images where most of the contrast between tissues is due to differences in the T1 value. T1 is the rate of longitudinal relaxation for a tissue type. For T1w images, the repetition time (TR) can be less than T1 (typically <500 ms) and echo time (TE) can be less than T2 (typically <30 ms)).

T2w uses T2 weighted images (i.e., images where most of the contrast between tissues is due to differences in the T2 value. T2 is the rate of transverse relaxation for a tissue type. For T2w images, TR can be greater than T1 (typically >=2 000 ms) and TE can be less than T2 (typically >=100 ms).

FLAIR is a method that can null fluids. For example, FLAIR may be used in to suppress cerebrospinal fluid (CSF) effects on the image, and emphasize certain lesions, such as multiple sclerosis (MS) plaques. For FLAIR images, the inversion time can be controlled relative to T1.

DWI uses the diffusion of water molecules to generate contrast in MR images.

Thus, images collected using any of these protocols can show the same brain structures, but the tissue types having the most contrast can differ according to the protocol used. The domain label of the image can identify which protocol was used.

In other embodiments, the domain label can identify the manufacturer and/or model of the MR scanner used to collect the image.

In other embodiments, the domain label can identify an institution (e.g., hospital) from which the image was received. Different hospitals may use scanners of different manufacturers or models, different protocols, or different sequences.

Whereas the first subset of the training images only includes images from a single domain, the second subset of images have images from a plurality of domains, and are labeled to identify the domain. The second subset of images are not labeled to identify whether the image shows normal or abnormal tissue, nor whether a target tissue is contained in the image.

Each of the subsets of images can be divided into a plurality of batches. The training images are input to the data preprocessing block 820 by alternating between a first batch of images from the first subset (labeled normal/abnormal, all from a single domain) and a second batch of images from the second subset (containing normal and abnormal images from plural domains, labeled to identify the domain).

The preprocessing block 820 performs data preparation steps to create an orientation base. This can be achieved by either doing a rigid registration of the subjects to a template (so all data can be processed in the template space) identifying main regions of the brain (e.g., hemispheres, lobes). Multi-scale deep reinforcement learning or deep image-to-image networks can be used to detect specific landmarks (e.g., tip of occipital bone, crista galli) in the head to estimate mid-sagittal plane (MSP) and/or fissures, and use the detected landmarks to reorient all data relative to specific landmarks (brain stem, AC-PC commissure etc.).

The first batch of images are used by the generator to learn to distinguish normal and abnormal images from each other, and the second batch of images are used by the discriminator to learn to determine from which domain each image is acquired.

The preprocessing block 820 can perform bias field correction (BFC). BFC removes a low-frequency and very smooth signal that corrupts MR images, such as those produced by legacy MR scanners. For example, in one embodiment, the BFC can divide a corrupted image by an estimated bias field signal using a surface fitting approach. In another embodiment, BFC computes mean tissue values for white matter, grey matter, and cerebrospinal fluid. These mean values are used in a model that includes a parameter for the local bias effect. Gain estimates from the model can be used to fit a tri-cubic B-spline, which provides an estimate of the non-uniformity. The original image can be divided by this spline to apply the BFC.

Additionally, non-brain tissues in the head—either connecting to the brain, or not—can be of interest for a complete assessment of the patient. Such non-brain tissues may include orbits, optical nerves, sinuses etc. Another preprocessing step can perform skull stripping on the structural data to separate brain from other structures in the whole head scan. The skull stripping can remove non-brain tissues such as skin, fat, muscle, neck, and eye balls from the input image data, to simplify automatic brain image segmentation and analysis. Therefore, the normal/abnormal framework can be specific to brain and/or non-brain structures.

During training, the preprocessing block 820 performs domain adaptation by back propagating filters to reduce the error rate of the normal/abnormal determination by the generator, and increase the error rate of domain determination by the discriminator based on latent variables from the generator. For example, when the preprocessing block 820 performs brain extraction to standardize the data, domain adaptation can be used. The preprocessing block learns to standardize the data during brain extraction. Each time a first batch of images are processed, the generator provides a set of matrices (feature maps) to the discriminator, and the discriminator tries to determine the domain of the images.

Other preprocessing techniques can be used, including but not limited to one or more of: correction of image geometry distortion due to gradient non-linearity, correction of image intensity non-uniformity that results when RF transmission is performed with a more uniform body coil while reception is performed with a less uniform head coil, contrast enhancement, sharpening, denoising, filtering, or the like.

The generator blocks 830 performs image segmentation (e.g., brain image segmentation), including locating objects and boundaries in images to separate an input MR image into multiple segments (sets of pixels). As a result of the segmentation, pixels within the same segment share certain characteristics, such as light intensity, and adjacent regions differ from each other in those characteristics. As a result of back propagation of the matrices received from the discriminator during training, the generator 830 is robust to domain variations (e.g., protocol, institution, manufacturer and model of scanner); the generator has learned invariant features between many domains while learning segmentation. During the test phase, the encoder can segment an input image, generate the latent variable values for the input image, and make the normal/abnormal determination, regardless of the domain.

In some embodiments, the generator 830 is a deconvolutional neural network. The generator 830 can use nonlinear predictive recurrent generative models. In some embodiments, the generator includes an encoder—decoder, as discussed below with respect to FIG. 9. The network performs region modeling, and models the intensity distribution of the tissue directly from healthy images in the training set. In some embodiments, the generator 830 uses adaptive thresholding for segmentation and abnormality detection, where the thresholds are learned during training. In other embodiments, a clustering technique (e.g., k-means) can be used for segmentation. The generator 830 is configured to perform bi-directional and multi-directional analysis of an input image.

The decoder of the generator 830 synthesizes an image from the latent variables. The synthesized images are used during training. During training, the discriminator 840 evaluates latent variables or synthesized images from the generator 830 and determines from which domain the input image corresponding to the latent variables/synthesized image originates. Backpropagation is applied in both generator 830 and discriminator 840 so the generator 830 learns to produce better synthesized images, and the discriminator 830 increases its error rate in identifying the domain from which the input images corresponding to the latent variables/synthesized images originate.

The discriminator 840 is used during the training phase, but not the test phase. The main task of the discriminator 840 is to discriminate the domain of the synthesized images produced by the decoder of the generator 830 (e.g., protocol, institution, scanner manufacturer/model). In so doing, the discriminator generates matrices which can be back propagated in the generator 830 to improve the ability of the encoder of the generator to provide domain invariant latent variables. In some embodiments, the discriminator 840 can be a convolutional neural network (CNN). Ideally, at the completion of training, the generator generates completely domain invariant latent variables, and the discriminator can no longer distinguish whether an image is from Domain A or Domain B using only the latent variable values. Even with a finite training image set, the trained generator can make the normal/abnormal determination with a high degree of accuracy, regardless of the source domain.

Figure 9:
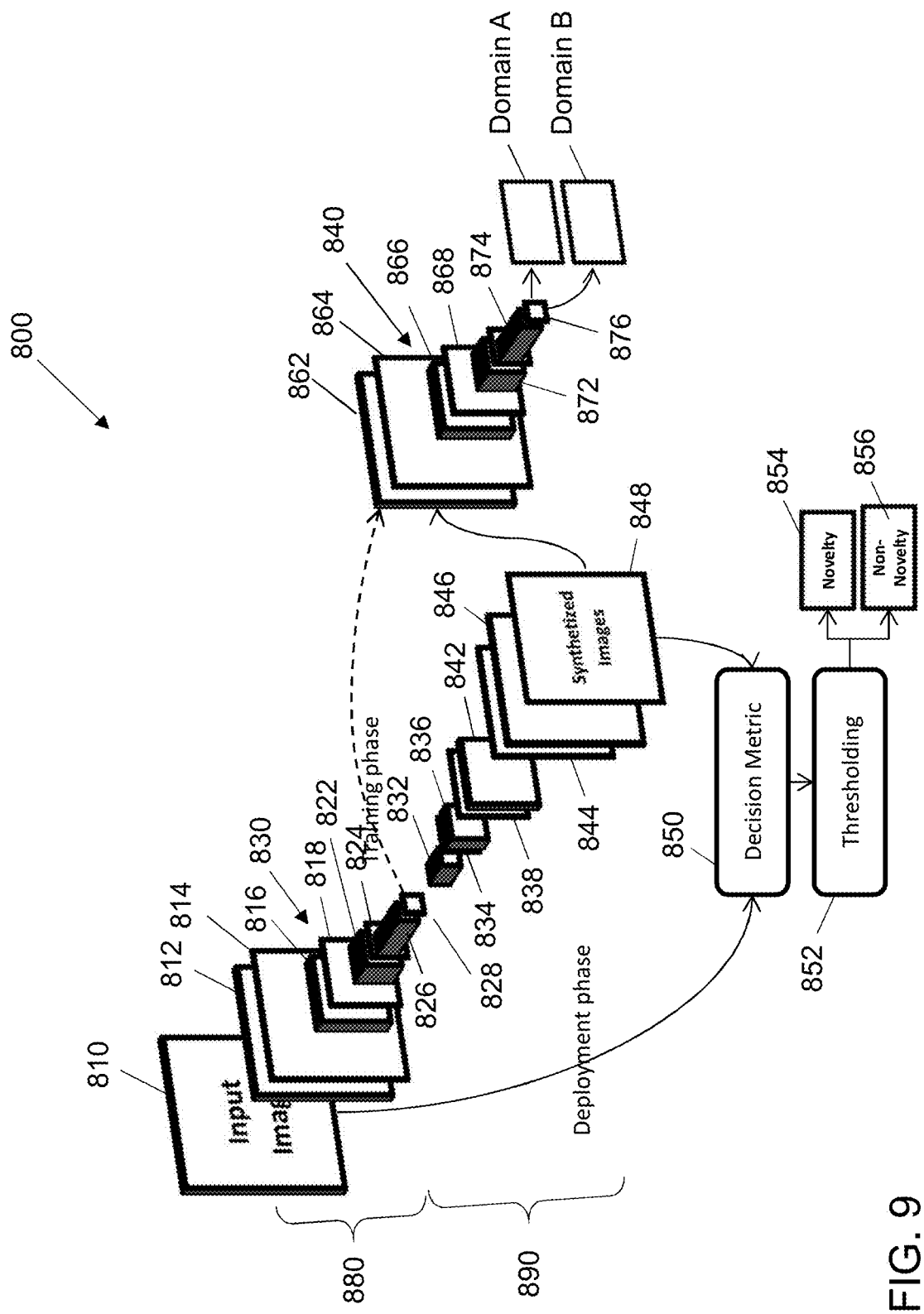
FIG. 9 is a block diagram of an exemplary system for the system using adversarial training using domain adaptation as shown in FIG. 8A.

FIG. 9 is a schematic diagram of the generator 830 and discriminator 840, as configured for training according to some embodiments.

The training input image set 810 as described above is provided.

The encoder 880 of generator 830 includes has three dense block layers 812, 816 and 822. Each of the dense block layers 812, 816 and 822 can a plurality of convolutions with a growth rate of 12 filters per layer. For example, each dense block layer 812, 816 and 822 can be the same as dense blocks 210 discussed above with respect to FIG. 4 (For brevity, the description of the dense blocks is not repeated).

The encoder 880 has two pooling layers 814, 818. The latent variable space has lower dimensionality than the input space, so the latent variable vector can be regarded as a compressed representation of the input. In the example of FIG. 9, there is a single latent variable vector 828. The representation output by the pooling layer 814 is more compressed than the input image 810, and the representation output by the pooling layer 818 is more compressed than the output of the pooling layer 814.

The three dense block layers 836, 842, 846, are configured for generating synthesized images. Each of the dense block layers 836, 842, 846 has a plurality of deconvolutions with 12 filters per layer for regenerating the image data. Each of the dense block layers 836, 842, 846 can be the same as dense blocks 210 as discussed above. The decoder 890 has regenerative layers 838 and 844. The generator 830 also includes skip connection (not shown) between dense blocks 812 and 846, between dense blocks 816 and 842, and between blocks 822 and 836, similar to the skip connections discussed above with respect to FIG. 3, as well as skip connections within blocks as discussed above with respect to FIG. 4. The generator has an input layer and a plurality of hidden layers, and the first neural network feeds the input medical image data forward to each of the hidden layers. The skip connections (not shown) feed forward the high resolution information in each convolution layer 812, 816, 822 of the encoder 880 to the corresponding deconvolution layer 836, 842, 846 in the decoder 890. Because back propagation (to update the higher encoder layers) is based on gradient functions that may tend to zero, keeping the high resolution information from the skip connections (not shown) allows deeper training without loss of high frequency details.

At the smallest (deepest) level, also referred to as the "bottleneck" of the network, the latent space has one manifolds 828 corresponding to one latent variable vector.

During training, the synthesized images 848 and filter matrices are output by the decoder 890 to the discriminator 840 and the decision metric block 850. In some embodiments, the decision metric block 850 points out the differences between the input image and the synthesized image and computes a metric based on the differences. The differences are abnormalities. The thresholding block 852 determines novelty (abnormal) or no novelty (normal).

In other embodiments, the latent variables from the bottleneck 828 are provided to the discriminator 840, and the discriminator 840 determines the domain of the synthesized image 848. The discriminator can have dense block layers 864, 868, 872, which can be the same as or similar to the dense block layer 210 of FIG. 4, a description of which is not repeated, for brevity. The discriminator determines the domain of the synthesized image 848, and provides a set of matrices (feature maps) to the generator 830 for back propagating.

FIG. 9 shows a generative adversarial network (GAN) 800 having a generator 830 and a discriminator 840. Other adversarial network designs, such as Wasserstein GAN (WGAN) can be substituted.

FIG. 10-13 show the configuration of the GAN 800 during the training and test phases. The first batch of training input images 1001 are input to the encoder 880 of the generator 830. The first batch of training input images 1001 include both images with normal (not novel) tissue and images with abnormal (novel) tissues. The images are labeled to indicate whether the images are normal. All of the first batch of images are from a single domain (e.g., domain A). The encoder 880 generates the latent variable values corresponding to the input images, and the decoder 890 provides a synthesized image 1002 based on the latent variables. The decoder 840 provides a set of matrices (feature maps) to the discriminator 840 which will act as a domain classifier.

Figure 10:
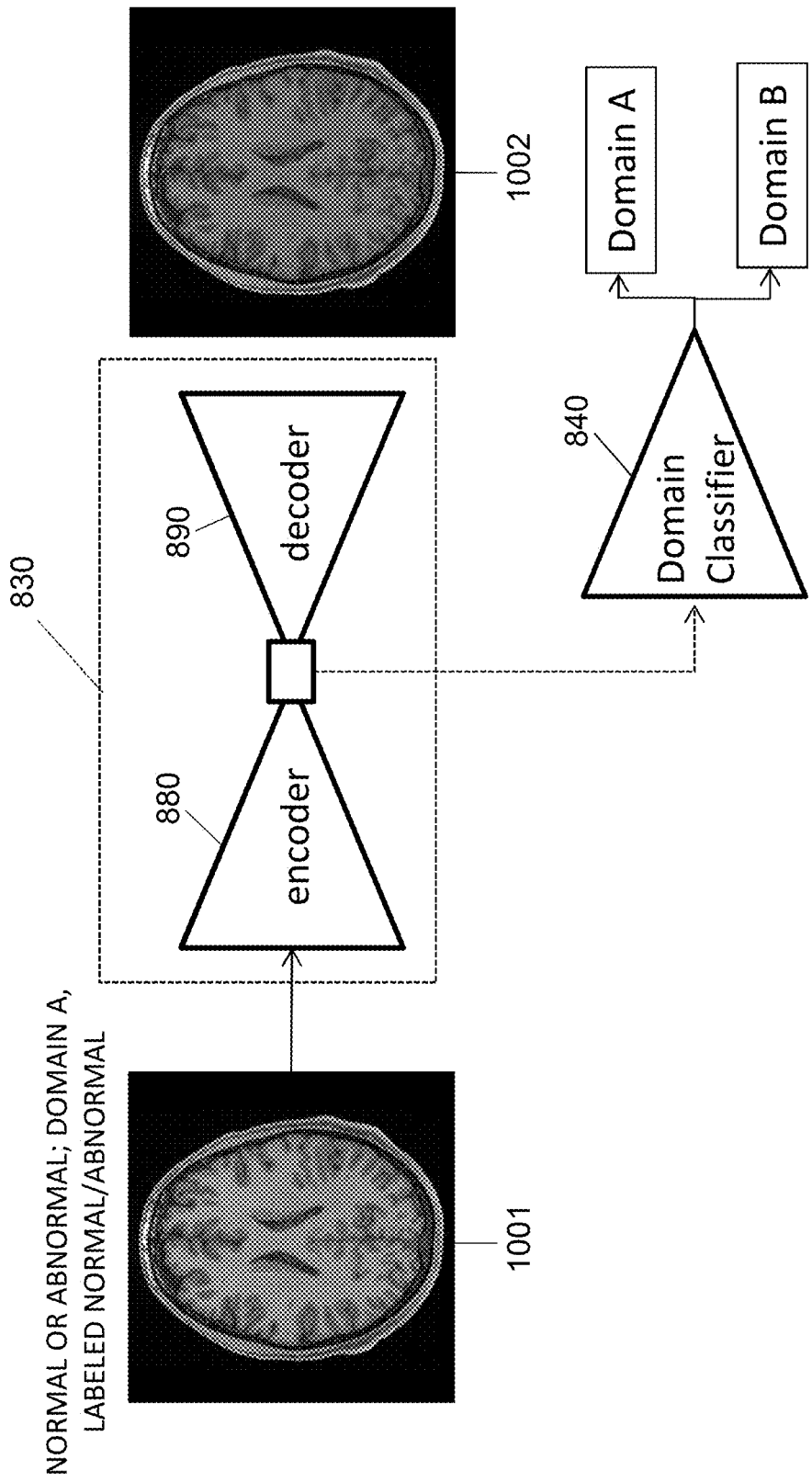
FIG. 10 is a schematic diagram showing training of the system of FIG. 9 to detect abnormalities using a first batch of training data.

FIG. 10 shows the initial configuration of the GAN during training using the first batch of training input images 1001. The images 1001 include normal and abnormal images, all from a single domain (e.g., domain A). The images 1001 are labeled to identify their normal/abnormal status. The images 1001 are input to the encoder 880 of the generator 830. The encoder 880 provides a latent variable vector (e.g., mean light intensity) to the decoder 890 and to the discriminator 840, which is a domain classifier in this example. The decoder creates the synthesized images 1002. The encoder 880 learns to make the normal/abnormal determination and to generate latent variables from the image 1001.

Figure 11:
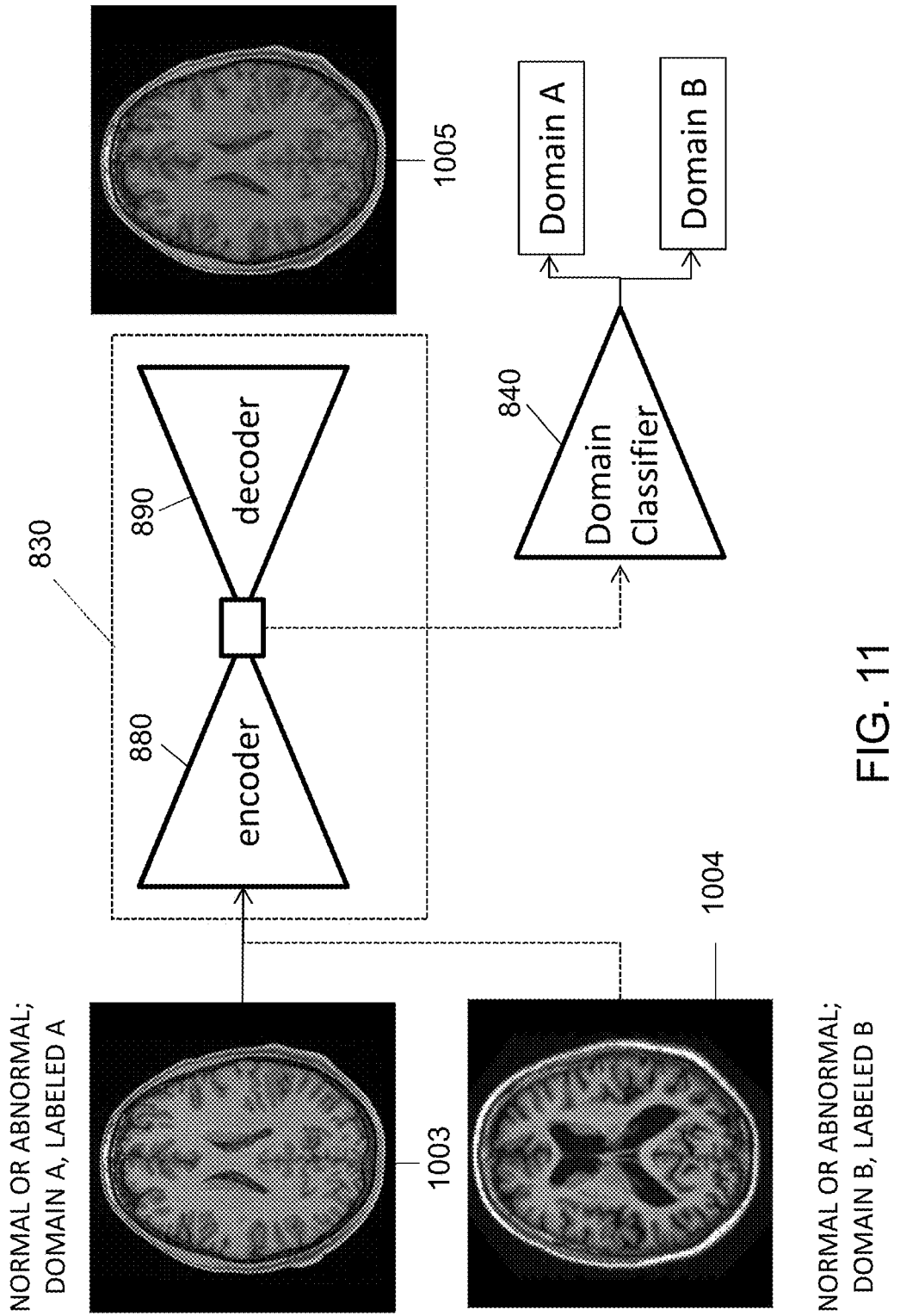
FIG. 11 is a schematic diagram showing additional training of the system of FIG. 9 to determine input image domain using a second batch of training data.

FIG. 11 shows the GAN during training using the second batch of training input images 1003, 1004. The images include normal images 1003 and abnormal images 1004, from each domain (e.g., domain A and domain B). The images 1003, 1004 are labeled to identify their domain (A or B). The labels do not contain normal/abnormal information. The images 1003, 1004 are input to the encoder 880 of the generator 830. The encoder 880 provides a latent variable vector (e.g., mean light intensity) to the decoder 890 and to the discriminator 840 (domain classifier). The decoder creates the synthesized images 1005. The discriminator 840 learns to discriminate whether each image is an image 1003 from domain A or an image 1004 from domain B.

Figure 12:
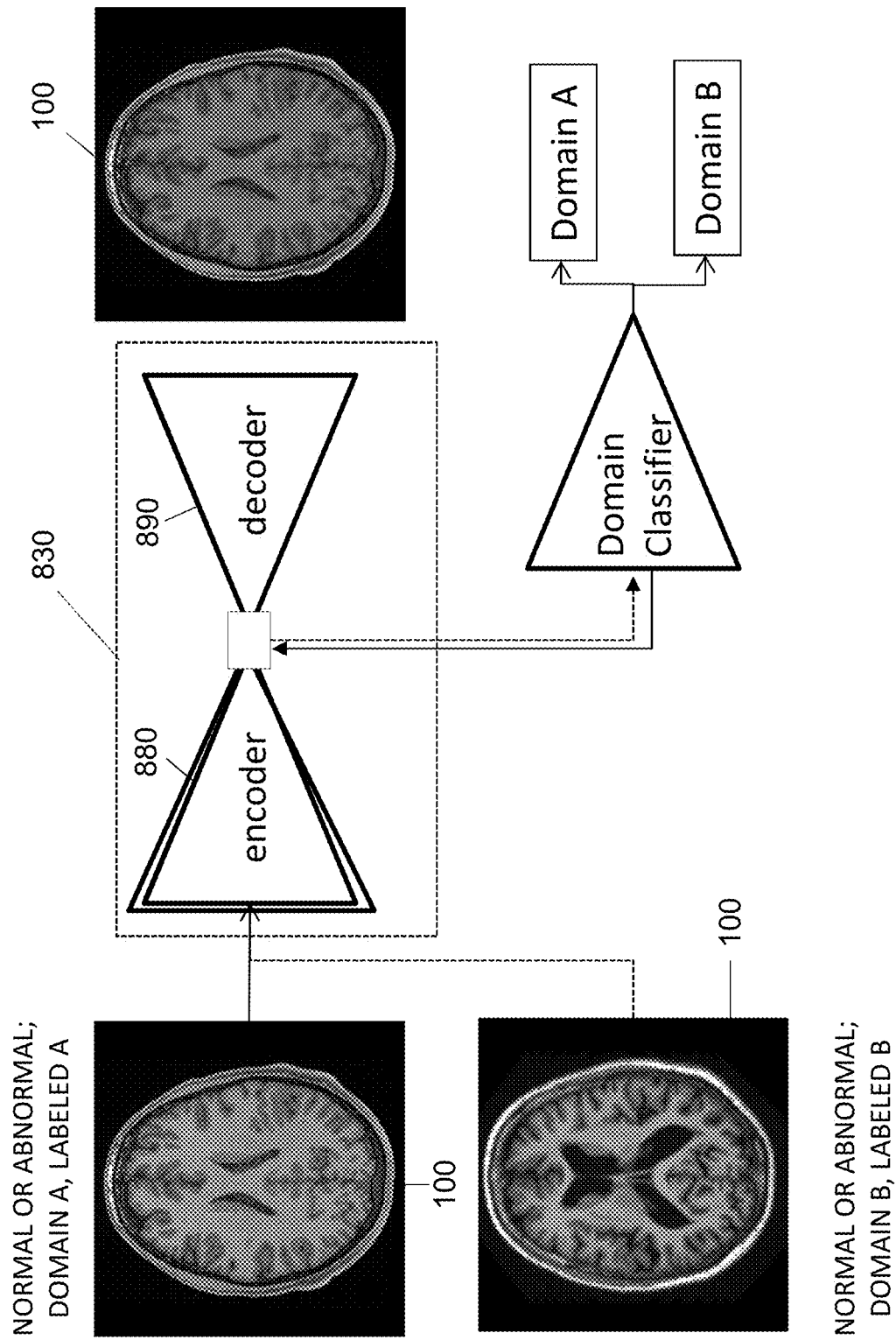
FIG. 12 schematically shows back propagation in the encoder of FIG. 9.

FIG. 12 shows the GAN after inputting the second batch of training input images 1003, 1004. The discriminator 840 outputs matrices (feature maps) to the generator 830. The generator 830 back propagates these matrices to enable the generator 830 to reduce its false negative result rate (i.e., percentage of abnormal images incorrectly classified as normal by generator 830). The discriminator 840 back propagates the matrices (feature maps) received from generator 830 to enable the discriminator 840 to discriminate from which domain the input images were acquired, regardless of whether the tissue is normal or abnormal.

Each time a first batch 1001 and a second batch 1003, 1004 are processed, and the back propagation step of FIG. 12 is performed, the generator 830 improves its ability to make the normal/abnormal classification regardless of domain, and makes it more difficult for the discriminator to discriminate from which domain an image was collected based on the latent variable vector. Also, with each iteration, the discriminator improves its ability to discriminate from which domain an image was acquired, regardless of whether the tissue is normal or abnormal.

Figure 13:
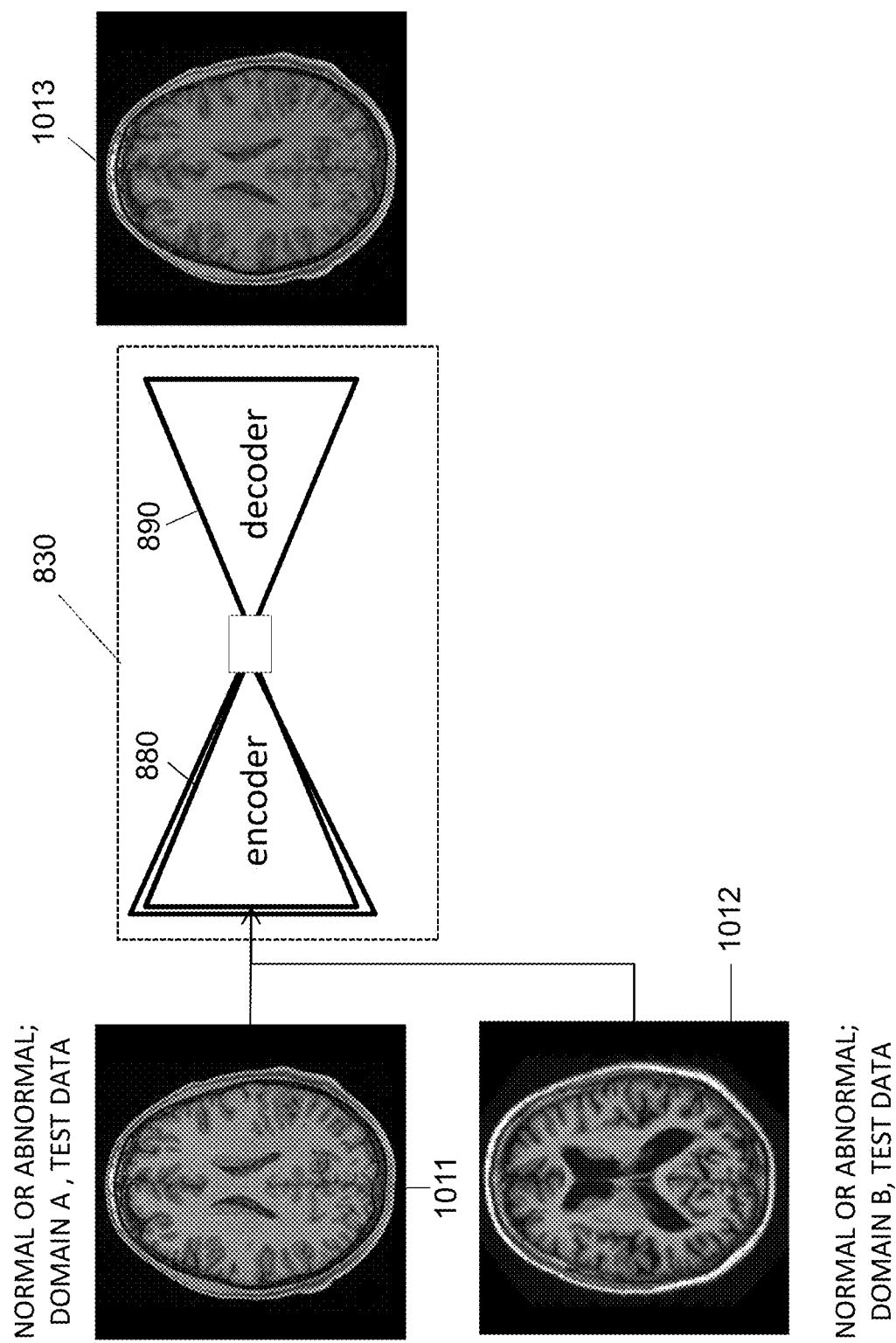
FIG. 13 schematically shows the test phase configuration of the encoder of FIG. 9.

FIG. 13 shows the configuration during the test phase. The discriminator 840 is not used. The test input images can include normal and abnormal images 1011 from domain A, and normal and abnormal images 1012 from domain B. The encoder 880 generates the latent variable values from which the normal/abnormal classification is made. The decoder 890 outputs a synthesized image 1013.

Figure 14:
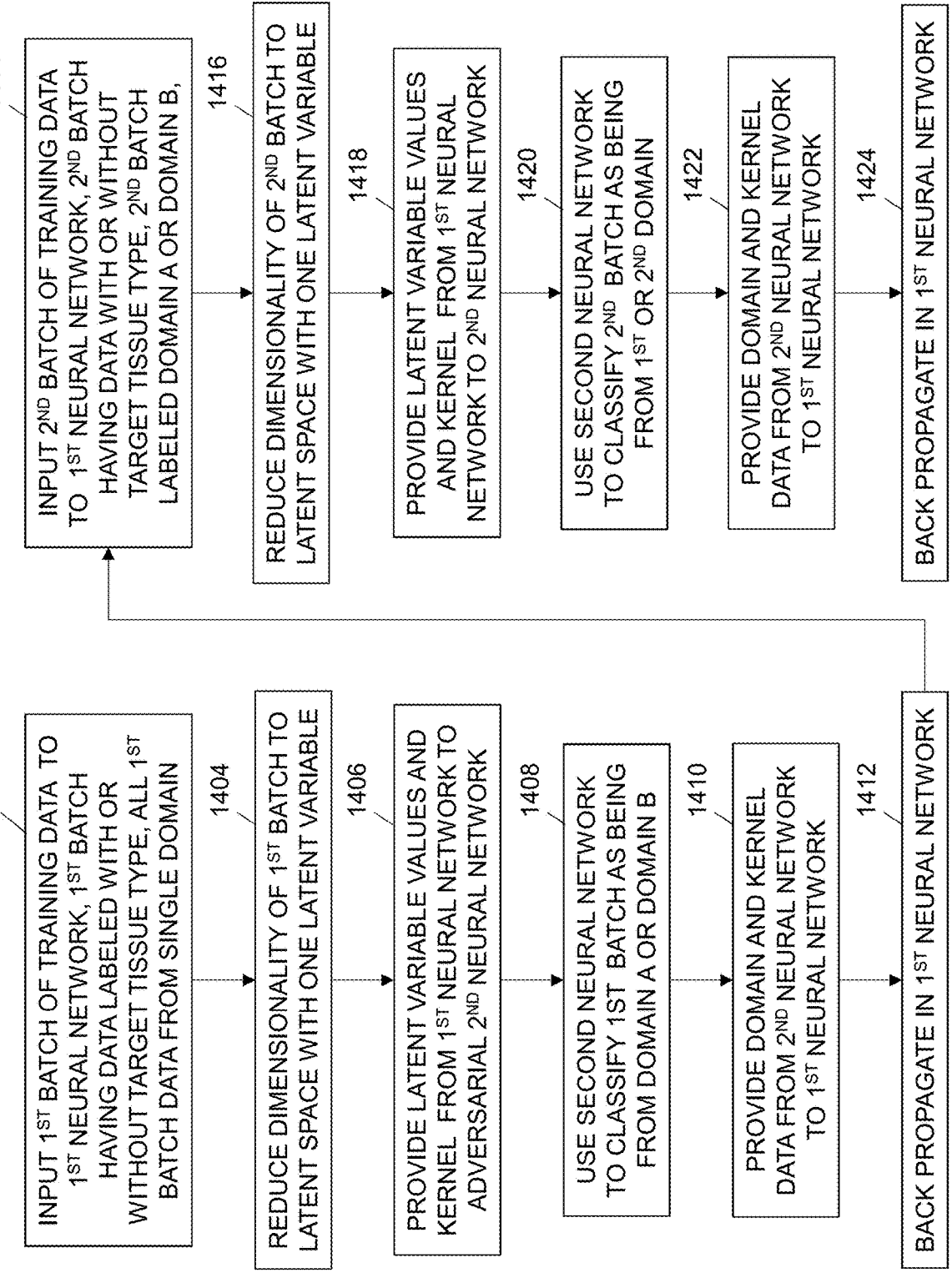
FIG. 14 is a flow chart showing training of the system of FIG. 9.

FIG. 14 is a flow chart of an exemplary training method for the system of FIGS. 8-13.

At step 1402, a first batch of training image data are input to a first neural network (e.g., a generator network, such as a DenseNet, or a network 830 (FIG. 9) having an encoder 880 and a decoder 890). The first batch of image data have data labeled as abnormal (with a target tissue type) or normal (without a target tissue type). The first batch of training image data are all acquired from a single domain (single protocol, single institution, single scanner vendor, and single scanner model).

At step 1404, the encoder 880 of the first neural network 830 reduces the dimensionality of the first batch of training images to a latent space with one latent variable (e.g., mean light intensity of the image). In some embodiments, the reduction in dimensionality is performed by a deep learning architecture, such as the densely connected convolutional neural network described above with reference to FIGS. 4 and 9. The first neural network has an input layer and a plurality of hidden layers, and the first neural network feeds the input medical image data forward to each of the hidden layers.

At step 1406, the first network provides the latent variable value vector and the kernel (the matrices or feature maps) for the first batch of image data from the first network to the second (discriminator) network. The second network can be a convolutional neural network. The second neural network is configured to classify the latent variable values according to one or more features defining a domain of the input medical image data. The second neural network is configured to provide the domain of the input medical image data from the second neural network to the first neural network.

At step 1408, the second neural network classifies the first batch of latent variable data as being from the domain A or domain B. In this example, all of the first batch of image data are from domain A.

At step 1410, the second neural network provides the domain and the kernel (matrices or feature maps) from the second neural network to the first neural network.

At step 1412, the matrices from the second neural network are back propagated in the first neural network based on the domain of the input medical image data as determined by the second neural network.

Steps 1414-1424 include repeating training of the first and second neural networks, training the second neural network, and performing the backpropagation using a second batch of input medical image data. The second batch of input medical image data have been acquired using a plurality of different protocols, a plurality of different magnetic resonance scanner models, scanners manufactured by a plurality of different manufacturers, and/or a plurality of different institutions.

At step 1414, a second batch of training image data are input to the first neural network. The second batch of training image data include data acquired from two different domains (protocols, institutions, scanner vendors, and/or scanner models). The image data are labeled as originating from domain A or domain B. The second batch of data include both normal and abnormal tissue images. The labels of the second batch of data do not identify the normal or abnormal characteristics of the images.

At step 1416, the encoder 880 of the first neural network 830 reduces the dimensionality of the second batch of training images to a latent space with one latent variable (e.g., mean light intensity of the image). The first neural network feeds the input medical image data forward to each of the hidden layers.

At step 1418, the first network provides the latent variable value vector and the kernel (the matrices or feature maps) for the second batch of image data from the first network to the second (discriminator) network.

At step 1420, the second neural network classifies the second batch of latent variable data as being from the domain A or domain B. In this example, the second batch of image data includes image data from domain A and image data from domain B, so the second neural network learns to classify latent variable data as corresponding to images acquired from domain A or domain B.

At step 1422, the second neural network provides the domain and the kernel (matrices or feature maps) from the second neural network to the first neural network.

At step 1424, the matrices from the second neural network are back propagated in the first neural network based on the domain of the input medical image data as determined by the second neural network.

Figure 15:
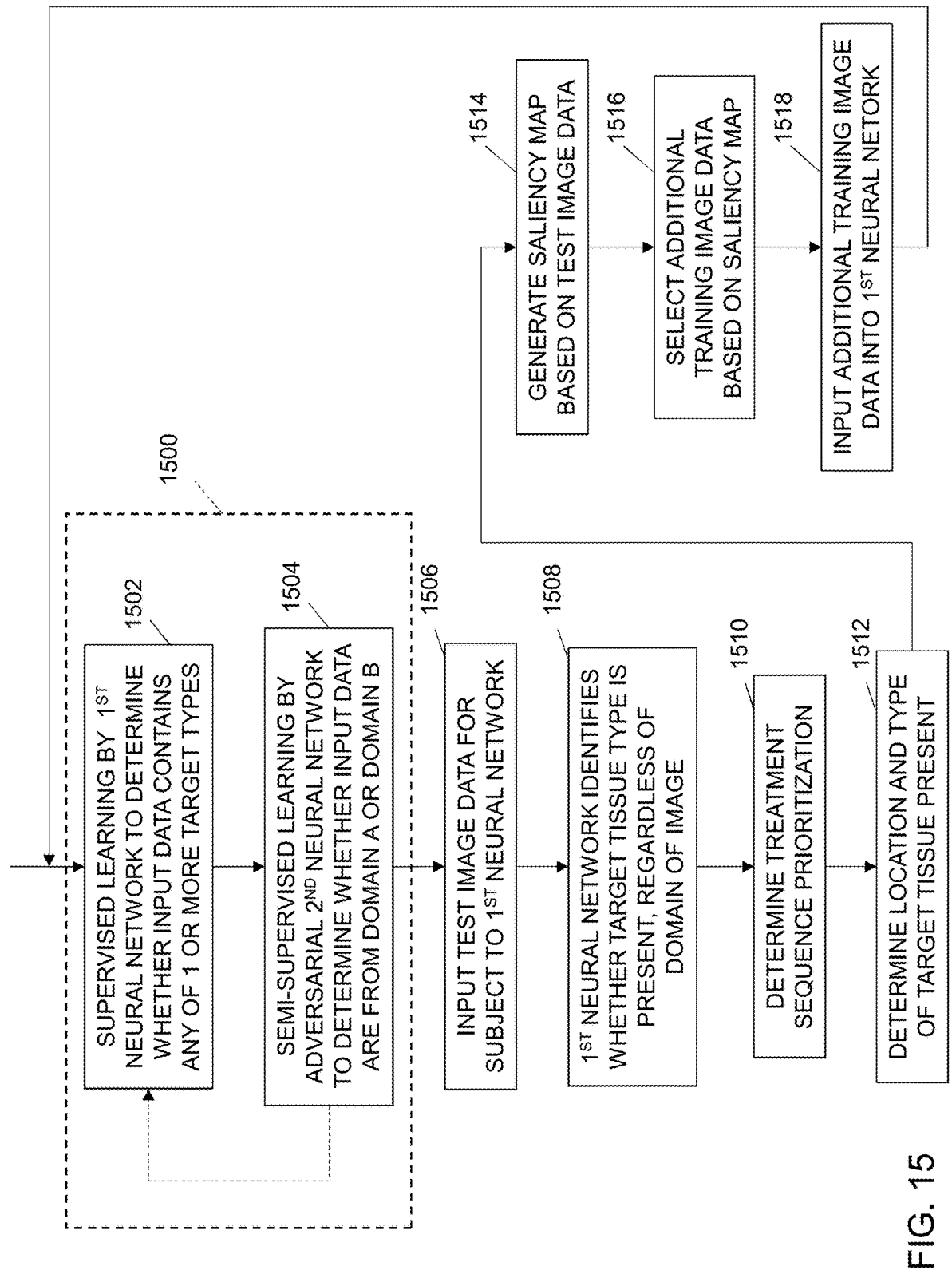
FIG. 15 is a flow chart showing additional training and the test phase of the system shown in FIG. 9.

FIG. 15 is a flow chart showing continued training after step 1424, followed by the test phase.

After step 1424, step 1500 provides continued training, which repeats steps 1402-1424 of training the first neural network, training the second neural network, and performing the backpropagation using a first set of input medical image data and a second set of input medical image data.

At step 1502, the system repeats steps 1402-1412 to continue the supervised learning by the first neural network to determine whether the image input data contains one or more of the target tissue (e.g., abnormality). The first neural network outputs the original image, the latent variable vector and the kernel (matrices or feature maps) to the second neural network.

At step 1504, the system repeats steps 1414-1424 to continue the semi-supervised learning by the second neural network to determine whether the image input data was acquired from domain A or domain B. The second neural network outputs the domain and the kernel (matrices or feature maps) to the first neural network. The first and second networks each back propagate the matrices received from the other.

Steps 1502 and 1504 are repeated until the training data are exhausted, a predetermined number of training images have been processed, or the domain adaptation satisfies a convergence criterion. With each iteration, the first batch of input medical image data includes data collected from a single institution, using a single protocol, from a single type of magnetic resonance (MR) scanner, and the second batch of input medical image data includes data collected using two or more protocols, or using two or more types of MR scanners, or from two or more different institutions.

With each back propagation, the rate of false negative (i.e., false normal) results from the first neural network decreases, and the latent variable value generation by the first neural network becomes increasingly domain invariant. That is, the reduction of false negatives (false normal) classifications from the first network becomes increasingly independent of the domain from which the input images are acquired.

With each back propagation, the latent variables become more domain invariant, so the first neural network is better able to fool the second neural network; the error rate of the second neural network increases, and the probability that the second neural network can correctly determine whether the image was acquired from the first domain or the second domain decreases.

At the completion of training, the use of the second neural network is discontinued. Only the first neural network is used during the test phase.

At step 1506, a test image (e.g., an MR image of a patient's brain) is input to the first neural network 830 of system 800.

At step 1508, the first neural network identified whether the target tissue type is present (i.e., whether the image is abnormal or normal), regardless of the domain from which the image was acquired.

At step 1510, in some embodiments, the processor of system 800 can determine a treatment sequence prioritization. For example, the patients for whom the result of the analysis is "abnormal" can be prioritized for further imaging, tests, and/or consultation with a doctor. In some embodiments, the latent variable data can be analyzed further to select additional imaging (e.g., more diffusion, perfusion, angio, etc) sufficient to make a diagnosis. In an emergency situation, the processor can send a notification to medical staff. In some embodiments, the analysis can suggest medical treatment to address the abnormality. Patients for whom the result of the analysis is "normal" can be reviewed after the high priority patients.

In some embodiments, the first neural network classifies a plurality of test images as normal or abnormal using the first neural network. For example, upon detecting that one of the plurality of test images has a predetermined class (e.g., having a tumor), based on the classifying, and in response to the detecting, displaying (on the display device 124) the one of the plurality of test images and an identification of an image or scan sequence to be performed.

At step 1512, in some embodiments, the processor of system 800 can determine the location and type of target tissue present.

At step 1514, after classifying a plurality of test images using the first neural network, the first neural network 830 can generate a saliency map based on the test images, using the first neural network. The saliency map is generated using an aggregation of all of the gradients in each voxel position. The saliency map transforms data from the classification result back to the input for assessing the value of the gradient. The saliency map has dimensions that match the dimension of the input, with some voxels highlighted to represent the abnormality. If the saliency map is overlaid it on top of the original input data, the saliency map shows which region (hot spot) of the data has more impact on the classification.

At step 1516, in some embodiments, the processor selects additional training image data based on the saliency map.

At step 1518, the additional training image data can be input into the first neural network.

FIGS. 16A-16D show an example of normal versus abnormal training. In FIGS. 16A-16D, the number of iteration indicates the number of times the full set of training data are processed (and matrices updated). At each point on the horizontal axis (iterations), the networks process all images.

Figures 16C, 16D:
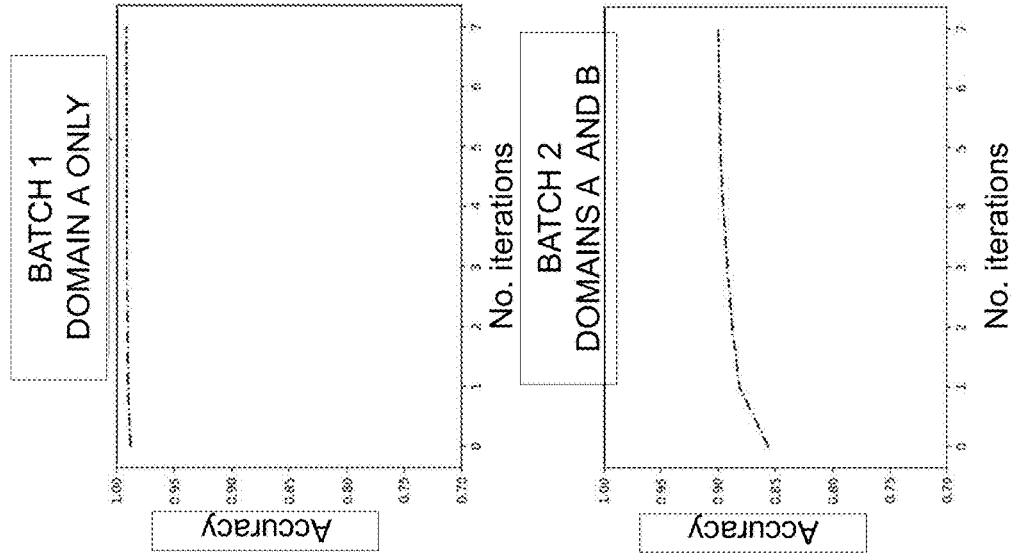
FIGS. 16A-16D compares the speed of training for three systems, using generative adversarial training (GAN), Wasserstein GAN (WGAN), and domain adaptation.
Figures 16A, 16B:
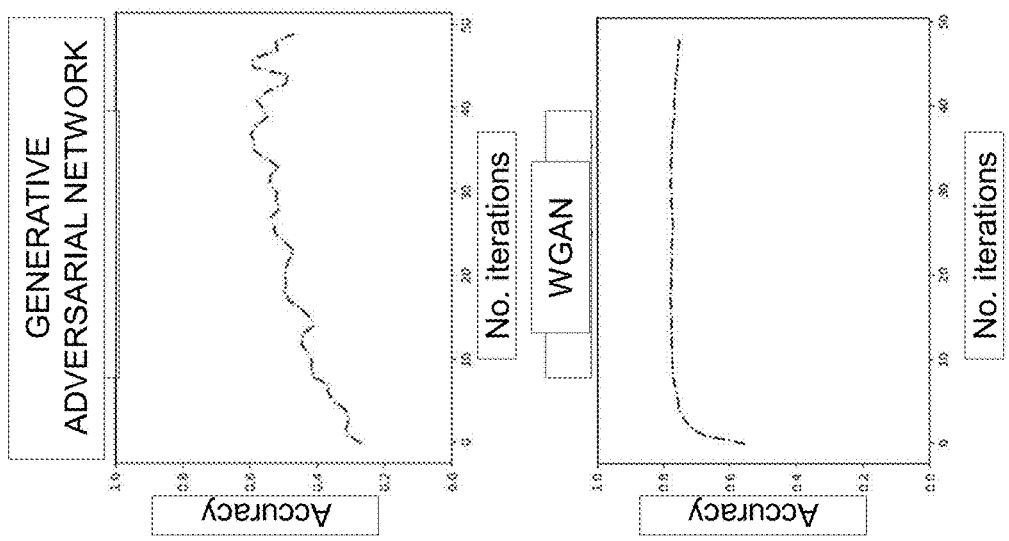

FIG. 16A shows accuracy of normal/abnormal classification using a "classical" generative adversarial network (GAN). In this method, a generator as described in FIGS. 4 and 9 learns to classify images as normal or abnormal and generates synthesized images. The discriminator (not shown) used for FIG. 16A differs from the discriminator of FIG. 9. Whereas the discriminator of FIG. 9 tries to determine whether latent variable values correspond to images acquired from Domain A or Domain B; the discriminator of FIG. 16A is trained to classify images as either real input images or synthesized images (from the generator). During training, the accuracy of the generator in the normal/abnormal determination increases, and the error rate of the discriminator—in determining whether a received image is a real image of a synthesized image—increases (but is less sensitive to whether the image is normal or abnormal.

FIG. 16A shows the ratio of accurate to total classifications after many repetitions of training a GAN network. The accuracy begins at about 0.25 (25%). After 50 iterations of two training batches, the accuracy improves to about 0.5 (50%).

FIG. 16B uses a WGAN system for improving the speed of training. Using WGAN, the accuracy begins at about 0.55 (55%), and within ten iterations of two training batches, the accuracy improves to about 0.75 (75%). Thus, learning is faster for WGAN than for GAN.

FIG. 16C shows the training accuracy of a system as described above and shown in FIGS. 4 and 9, during the training. The first batch of images are labeled as normal or abnormal, and all images are from a single domain A. The accuracy begins at nearly 1.0 (100%), and remains at nearly 1.0 (100%) after seven iterations. Note that the horizontal axis scale in FIGS. 16C and 16D is different from the horizontal axis scale in FIGS. 16A and 16B.

FIG. 16D shows the training accuracy of the system of FIGS. 4 and 9 upon training with image data from domains A and B. The accuracy begins at 0.85 (85%), but within 7 iterations, the accuracy approaches 0.9 (90%). Thus, the system and method of FIGS. 8-15 has better accuracy than a classical GAN or WGAN approach, and learning is very fast.

Other embodiments can include several variations. For example, the method can be implemented to analyze single or multiple two-dimensional (2D) slices (e.g., thick and axial) or three-dimensional (3D) volumes.

In some embodiments, the method can output a risk score. For example, the score may be a number between 0.0 and 1.0. A user can also configure a threshold value for an "abnormal" classification, so the results can be provided as a binary variable (normal/abnormal). Different users, clinicians or institutions may specify different thresholds.

In an emergency trauma setting, the method may result in automatically routing all positive results (abnormality or a probability of abnormality above a predetermined threshold) to a neuro-radiologist, while the remaining images may be read by a general radiologist.

In some embodiments, the results can be presented as hot-spot (i.e., a highlighted location) in one of more image slice(s).

Some embodiments of the method can be implemented in an embedded processor in the scanner device, in an image reading workstation, or in a standalone workstation, or other computing device.

In another embodiment, the results can be sent automatically via message communications to a picture archiving and communication system (PACS) together with the image series that was acquired for the patient.

The methods described herein achieve a very low rate of false negatives, i.e., there is a high probability that data confirmed as normal by the system do not have any lesion or other target tissue. In this way, the system can exclude healthy patients having normal scans from the reading pipeline, leading to increased reading efficiency for the radiologist or technician. Following the classification of data into negatives and positives, an error analysis can be performed to identify any false negatives and build more specific classifiers for this category. This can be accomplished in two ways. According to one technique, specific features can be annotated for this data or subclasses of data, constituting the "ground truth" for building a classifier with better discrimination positive/negative. According to another technique, saliency maps can be used to identify significant information that can improve the classification rate.

In some embodiments, the results can be displayed to the user at the time of the scan acquisition. The user can then alert other medical staff for preparing the subsequent interventions. The results can also be used to tailor the subsequent image acquisitions.

The methods and systems described herein can be valuable to multiple business units, especially to MR and CT, for the diagnostic/prognostic imaging of abnormalities in the brain, lungs, breast, liver, prostate, etc. These methods are well aligned with today's emergency room setting: the methods can be easily integrated into the scanning protocol and may impact throughput, triage, and treatment workflow. Thus, the method can be advantageous to healthcare (HC) and diagnostic imaging (DI) applications of MR. The method can also be used in a regular reading setting to prioritize reading of abnormal cases.

The methods and system described herein may be at least partially embodied in the form of computer-implemented processes and apparatus for practicing those processes. The disclosed methods may also be at least partially embodied in the form of tangible, non-transitory machine readable storage media encoded with computer program code. The media may include, for example, RAMs, ROMs, CD-ROMs, DVD-ROMs, BD-ROMs, hard disk drives, flash memories, or any other non-transitory machine-readable storage medium, wherein, when the computer program code is loaded into and executed by a computer, the computer becomes an apparatus for practicing the method. The methods may also be at least partially embodied in the form of a computer into which computer program code is loaded and/or executed, such that, the computer becomes a special purpose computer for practicing the methods. When implemented on a general-purpose processor, the computer program code segments configure the processor to create specific logic circuits. The methods may alternatively be at least partially embodied in a digital signal processor formed of application specific integrated circuits for performing the methods.

Although the subject matter has been described in terms of exemplary embodiments, it is not limited thereto. Rather, the appended claims should be construed broadly, to include other variants and embodiments, which may be made by those skilled in the art.

What is claimed is:

1. A method for processing medical image data, comprising:
   inputting medical image data to a variational autoencoder configured to reduce a dimensionality of the medical image data to a latent space having one or more latent variables with latent variable values as an encoder, such that the latent variable values corresponding to an image with no tissue of a target tissue type fit within one or more clusters, the variational autoencoder having been trained with the encoder and a decoder configured to regenerate images from the training values of the latent variables output by the encoder;

determining a probability that the latent variable values corresponding to the medical image data fit within the one or more clusters of latent variable values of training image data for the variational autoencoder, the probability determined from the latent variable values for the medical image output by the encoder relative to the clusters of the latent variable values of the training image data for the variational autoencoder; and determining that a tissue of the target tissue type is present in response to a determination that the medical image data have less than a threshold probability of fitting within any of the one or more clusters based on the latent variable values.

2. The method of claim 1, wherein determining the probability includes performing an outlier detection process.

3. The method of claim 2, wherein the outlier detection process includes a random sampling consensus method.

4. The method of claim 2, wherein the outlier detection process includes a random forest method.

5. The method of claim 2, wherein the outlier detection process includes performing a statistical test.

6. The method of claim 2, wherein the outlier detection process includes a classification method.

7. The method of claim 1, further comprising, before the inputting, training the variational autoencoder using a set of the training image data representing images from subjects without the target tissue type.

8. The method of claim 7, wherein the training includes deep unsupervised learning.

9. The method of claim 7, further comprising:
clustering the training image data into the one or more clusters in the latent variables based on values of an input parameter; and
determining a probability that a subject having a subject input parameter value also has a latent variable value that fits within one of the one or more clusters corresponding to the subject input parameter value.

10. A medical image system, comprising:
a non-transitory, machine readable storage medium storing program instructions and medical image data; and
a programmed processor coupled to the storage medium and configured by the program instructions for:
input of medical image data to a variational autoencoder configured to reduce a dimensionality of the medical image data to a latent space having one or more latent variables with latent variable values as an encoder, such that the latent variable values corresponding to an image with no tissue of a target type fit within one or more clusters of the values of the latent variables, the variational autoencoder having been trained with the encoder and a decoder configured to regenerate images from the training values of the latent variables output by the encoder;
detection of whether the latent variable values corresponding to the medical image data fit within the one or more clusters of latent variable values of training image data for the variational autoencoder, the fit determined from the latent variable values for the medical image output by the encoder relative to the clusters of the latent variable values of the training image data for the variational autoencoder; and
determination that a tissue abnormality is present in response to a determination that the medical image data have less than a threshold probability of fitting within any of the one or more clusters.

11. The medical image system of claim 10, wherein the detection includes performance of an outlier detection.

12. The medical image system of claim 11, wherein the outlier detection includes a random sampling consensus.

13. The medical image system of claim 10, wherein the medical image data comprises magnetic resonance (MR) data, and the system further comprises an MR scanner coupled to the processor and the storage medium, the MR scanner configured to acquire MR signals for reconstructing the MR image data.

14. The medical image system of claim 10, wherein the medical image data comprises magnetic resonance (MR) data, and the processor is configured to receive MR signals from an MR scanner and reconstruct the MR image data.

15. The medical image system of claim 10, further comprising a display coupled to the processor, wherein the processor is configured for:
display of a plot of a set of latent variable values corresponding to a set of training images, where the training images have no tissue of the target type, the plot further including the latent variable values corresponding to the medical image data.

16. The medical image system of claim 10, wherein the processor is configured to cause the latent variable values corresponding to the medical image data to be displayed differently from the set of latent variable values corresponding to a set of training images.

* * * * *